United States Patent
Mosenia et al.

(10) Patent No.: US 10,798,238 B2
(45) Date of Patent: Oct. 6, 2020

(54) SYSTEM AND METHOD FOR TRACKING A MOBILE DEVICE USER

(71) Applicant: The Trustees of Princeton University, Princeton, NJ (US)

(72) Inventors: Arsalan Mosenia, Princeton, NJ (US); Xiaoliang Dai, Princeton, NJ (US); Prateek Mittal, Princeton, NJ (US); Niraj K. Jha, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 0 days.

(21) Appl. No.: 16/340,930

(22) PCT Filed: Oct. 13, 2017

(86) PCT No.: PCT/US2017/056559
§ 371 (c)(1),
(2) Date: Apr. 10, 2019

(87) PCT Pub. No.: WO2018/071798
PCT Pub. Date: Apr. 19, 2018

(65) Prior Publication Data
US 2019/0289125 A1 Sep. 19, 2019

Related U.S. Application Data

(60) Provisional application No. 62/407,826, filed on Oct. 13, 2016, provisional application No. 62/547,290, filed on Aug. 18, 2017.

(51) Int. Cl.
*H04W 24/00* (2009.01)
*H04M 1/725* (2006.01)
(Continued)

(52) U.S. Cl.
CPC ........ *H04M 1/72572* (2013.01); *G01C 21/20* (2013.01); *G01C 21/30* (2013.01);
(Continued)

(58) Field of Classification Search
CPC ..... H04W 4/027; H04W 4/029; H04W 4/021; H04W 4/022; H04W 4/026; H04W 4/18;
(Continued)

(56) References Cited

U.S. PATENT DOCUMENTS 5,754,775 A * 5/1998 Adamson .......... H04L 29/12103
370/261
8,429,103 B1 * 4/2013 Aradhye ................ G06N 20/00
706/12
(Continued)

FOREIGN PATENT DOCUMENTS

WO 20160146617 A1 9/2016

OTHER PUBLICATIONS

International Search Report for PCT/US17/056559 dated Jan. 8, 2018.
(Continued)

*Primary Examiner* — Joseph Arevalo
(74) *Attorney, Agent, or Firm* — Meagher Emanuel Laks Goldberg & Liao, LLP

(57) ABSTRACT

According to various embodiments, a method for locating the user of a mobile device without accessing global position system (GPS) data is disclosed. The method includes determining the last location that the user was connected to a wireless network. The method further includes compiling publicly-available auxiliary information related to the last location. The method additionally includes classifying an activity of the user to driving, traveling on a plane, traveling on a train, or walking. The method also includes estimating the location of the user based on sensory and non-sensory
(Continued)

data of the mobile device particular to the activity classification of the user.

21 Claims, 10 Drawing Sheets

(51) Int. Cl.

| | |
|---|---|
| *H04W 4/029* | (2018.01) |
| *G01C 21/20* | (2006.01) |
| *G01C 21/30* | (2006.01) |
| *H04W 64/00* | (2009.01) |
| *H04M 15/00* | (2006.01) |
| *H04W 4/30* | (2018.01) |
| *H04W 4/02* | (2018.01) |

(52) U.S. Cl.
CPC ....... *H04M 1/72569* (2013.01); *H04M 15/00* (2013.01); *H04W 4/02* (2013.01); *H04W 4/029* (2018.02); *H04W 4/30* (2018.02); *H04W 64/00* (2013.01); *H04W 64/003* (2013.01); *H04M 2242/30* (2013.01)

(58) Field of Classification Search
CPC ..... H04W 64/00; H04W 64/006; H04W 4/02; H04W 4/046; H04W 4/12; H04W 4/20; H04W 4/50; H04W 4/90; H04W 60/04; H04W 76/50; H04M 1/72569; H04M 1/72572; H04M 1/72577
USPC ... 455/456.1, 456.4, 450, 456.3, 456.5, 458, 455/456.6, 438, 550.1
See application file for complete search history.

(56) References Cited

U.S. PATENT DOCUMENTS

| | | | | |
|---|---|---|---|---|
| 8,510,238 | B1* | 8/2013 | Aradhye | H04W 4/50 706/12 |
| 8,886,576 | B1* | 11/2014 | Sanketi | G06K 9/00 706/12 |
| 10,248,120 | B1* | 4/2019 | Siegel | G01C 21/3602 |
| 10,310,500 | B1* | 6/2019 | Brady | G07C 9/00182 |
| 2006/0230337 | A1* | 10/2006 | Lamont | G06F 16/29 715/202 |
| 2007/0229350 | A1* | 10/2007 | Scalisi | H04W 4/021 342/350 |
| 2009/0100165 | A1* | 4/2009 | Wesley, Sr. | G06F 15/173 709/223 |
| 2009/0222143 | A1* | 9/2009 | Kempton | B60L 15/2045 700/291 |
| 2011/0256881 | A1* | 10/2011 | Huang | G01S 5/0257 455/456.1 |
| 2011/0288768 | A1* | 11/2011 | Stefani | G06Q 30/0281 701/533 |
| 2011/0313648 | A1* | 12/2011 | Newson | G01C 21/30 701/447 |
| 2013/0059607 | A1* | 3/2013 | Herz | G01C 21/3602 455/456.1 |
| 2015/0202770 | A1* | 7/2015 | Patron | B25J 5/007 700/245 |
| 2015/0249904 | A1 | 9/2015 | Weiss et al. | |
| 2016/0205513 | A1 | 7/2016 | Choudhry | |
| 2017/0046496 | A1* | 2/2017 | Johnstone | G06Q 50/01 |
| 2017/0223508 | A1 | 8/2017 | Gordon | |
| 2017/0255966 | A1* | 9/2017 | Khoury | G08G 1/0129 |
| 2018/0367952 | A1* | 12/2018 | Devdas | H04W 4/029 |

OTHER PUBLICATIONS

Jun Han et al.: "ACComplice: Location inference using accelerometers on smartphones", Published in: 2012 Fourth International Conference on Communication Systems and Networks (COMSNETS 2012), Bangalore, India, Jan. 3-7, 2012.

Jingyu Hua et al.: "We Can Track You if You Take the Metro: Tracking Metro Riders Using Accelerometers on Smartphones", Published in: IEEE Transactions on Information Forensics and Security; vol. 12 , Issue: 2 , Feb. 2017.

Yan Michalevsky et al.: "PowerSpy: Location Tracking Using Mobile Device Power Analysis", The Proceedings of the 24th USENIX Security Symposium; Aug. 12-14, 2015 • Washington, DC.; ISBN 978-1-931971-232.

Arsalan Mosenia et al: "PinMe: Tracking a Smartphone User around the World", Published in IEEE Transactions on Multi-Scale Computing Systems 2018; DOI:10.1109/TMSCS.2017.2751462.

E. Owusu, J. Han, S. Das, A Perrig, and J. Zhang, "ACCessory: Password inference using accelerometers on smartphones," in Proc. ACM Wkshp. Mobile Computing Systems & Applications, 2012, p. 9.

Balakrishnan, M., Mohomed, I., and Ramasubramanian, V. "Where's that phone?: Geolocating IP addresses on 3G networks." In Proc. ACM SIGCOMM Internet Measurement Conference (2009), pp. 294-300.

Cai, L., and Chen, H. "TouchLogger: Inferring keystrokes on touch screen from smartphone motion." In Proc. HotSec (2011).

Chakraborty, S., Shen, C., Raghavan, K. R., Shoukry, Y., Millar, M., and Srivastava, M. "ipShield: A framework for enforcing context-aware privacy." In Proc. USENIX Symp. Networked Systems Design and Implementation (2014), pp. 143-156.

Felt, A. P., Wang, H. J., Moshchuk, A., Hanna, S., and Chin, E. "Permission re-delegation; Attacks and defenses." In Proc. USENIX Security Symposium (2011).

Hoh, B., Gruteser, M., Xiong, H., and Alrabady, A. "Enhancing security and privacy in traffic-monitoring systems." Pervasive Computing 5, 4 (2006), 38-46.

Hua, J., Shen, Z., and Zhong, S. "We can track you if you take the metro: Tracking metro riders using accelerometers on smartphones" arXiv preprint arXiv:1505.05958 (2015).

Jana, S., and Shmatikov, V. "Memento: Learning secrets from process footprints." In Proc. IEEE Symp. Security and Privacy (2012), pp. 143-157.

Khan, A. M., Lee, Y., Lee, S., and Kim, T.-S. "Human activity recognition via an accelerometer-enabled-smartphone using kernel discriminant analysis." In Proc. IEEE Int. Conf. Future Information Technology (2010), pp. 1-6.

Miluzzo, E., Varshavsky, A., Balakrishnan, S., and Choudhury, R. R. "Tapprints: Your finger taps have fingerprints." In Proc. ACM Int. Conf. Mobile Systems, Applications, and Services (2012), pp. 323-336.

Shokri, R., Theodorakopoulos, G., Le Boudec, J.-Y., and Hubaux, J.-P. "Quantifying location privacy." In Proc. IEEE Symp. Security and Privacy (2011), pp. 247-262.

Siirtola, P., and Roning, J. "Recognizing human activities user-independently on smartphones based on accelerometer data." Int. J. Interactive Multimedia and Artificial Intelligence 1, 5 (2012), 39-45.

Triukose, S., Ardon, S., Mahanti, A., and Seth, A. "Geolocating IP addresses in cellular data networks." In Proc. Passive and Active Measurement (2012), pp. 158-167.

Watanabe, T., Akiyama, M., and Mori, T. "RouteDetector: Sensor-based positioning system that exploits spatio-temporal regularity of human mobility." In Proc. USENIX Wksh. Offensive Technologies (2015).

Xu, Z., Bai, K., and Zhu, S. "Taplogger: Inferring user inputs on smartphone touchscreens using on-board motion sensors." In Proc. ACM Conf. Security and Privacy in Wireless and Mobile Networks (2012), pp. 113-124.

Zhou, X., Demetriou, S., He, D., Naveed, M., Pan, X., Wang, X., Gunter, C. A., and Nahrstedt, K. "Identity, location, disease and more; Inferring your secrets from android public resources." In Proc. ACM SIGSAC Conf. Computer & Communications Security (2013), pp. 1017-1028.

(56) References Cited

OTHER PUBLICATIONS

Zhu, H., Du, S., Li, M., and Gao, Z. "Fairness-aware and privacy-preserving friend matching protocol in mobile social networks." IEEE Trans. Emerging Topics in Computing 1, 1 (2013), 192-200.

L. T. Nguyen, Y. Zhang, and M. Griss. "Probin: Probabilistic inertial navigation." In The third Mobile Emily Localization and Tracking (MELT) Workshop held at the 7th IEEE Imemational Conference on Mobile Ad-hoc and Sensor Networks, Nov. 2010.

Aviv, A. J., Sapp, B., Blaze, M., and Smith, J. M. "Practicality of accelerometer side channels on smartphones" In Proceedings of the 28th Annual Computer Security Applications Conference (2012), ACM, pp. 41-50.

H. Xia, X. 'vVang, Y. Qiao, J. Jian, and Y. Chang, "Using multiple barometers to detect the floor location of smart phones with built-in barometric sensors for indoor positioning," IEEE Sensors, vol. 15, No. 4. pp. 7857-7877, 2015.

Azizyan, M., Constandache, I., and Roy Choudhury, R. "Surroundsense: mobile phone localization via ambience fingerprinting." In Proceedings of the 15th annual international conference on Mobile computing and networking (2009), ACM, pp. 261-272.

Pärkkä, J., Ermes, M., Korpipää, P., Mäntyjärvi, J., Peltola, J., and Korhonen, I. "Activity classification using realistic data from wearable sensors"; IEEE Trans. Information Technology in Biomedicine 10, 1 (2006), 119-128.

Preece, S. J., Goulermas, J. Y., Kenney, L. P., and Howard, D. "A comparison of feature extraction method or the classification of dynamic activities from accelerometer data", IEEE Trans. Biomedical Engineering 56, 3 (2009), 871-879.

\* cited by examiner

CarTracker

PlaneTracker

TrainTracker

WalkingUserTracker

SYSTEM AND METHOD FOR TRACKING A MOBILE DEVICE USER

CROSS-REFERENCE TO RELATED APPLICATIONS

This application claims priority to provisional applications 62/407,826 and 62/547,290, filed on Oct. 13, 2016 and Aug. 18, 2017, respectively, which are herein incorporated by reference in its entirety.

BACKGROUND OF THE INVENTION

The present invention relates generally to mobile devices and, more particularly, to a mechanism for locating a user of a mobile device based on non-sensory and sensory data stored on the mobile device and publicly available auxiliary information.

With widespread use of smartphones that can sense and collect environment-related data and process them to extract valuable information about the environment, ensuring privacy has become one of the most important challenges in the modern era. Indeed, rapid technological advances in electronics and mobile devices have led (and will continue to lead) to serious concerns about privacy in general, and location privacy in particular.

Modern smartphones are equipped with a number of compact sensors (such as but not limited to accelerometers and barometers) and powerful communication capabilities in order to offer a variety of services to their users. Although the numerous smartphone applications make the user's life convenient, they can also intentionally or unintentionally reveal personal or corporate secrets. In particular, they can leak valuable data about the location of the user, which can be processed to extract contextual information about habits, regular activities, and even relationships of the user. Moreover, disclosure of the user's location may expose him to location-based spams, scams, and advertisements, or make him a victim of blackmail or violence.

With the emergence of enormous privacy concerns in the last decade, several privacy policies have been put in place to force organizations to take their users' privacy into account. In particular, the U.S. Congress introduced the Geolocation Privacy and Surveillance Act in 2011 to provide a legal framework for giving government agencies, commercial entities, and private citizens clear guidelines for when and how geolocation information can be accessed and used. As a result, in all modern smartphones, an application must explicitly ask for the user's permission if it wants to access location services (such as GPS as a nonlimiting example).

A few recent research efforts have demonstrated the feasibility of locating smartphone owners without accessing location services. For instance, one proposed mechanism locates the user by processing the power consumption of the smartphone when the user travels through a known set of routes. This mechanism was able to detect 45% of driving trajectories in the best case scenario. Another mechanism showed that accelerometer readings can be used to estimate the trajectory and starting point of an individual who is driving. This mechanism was able to return two clusters of possible starting points (each including five points) such that the starting point was within one of the clusters.

The successful demonstration of location tracking suggests that revealing the user's location by processing presumably non-critical data is feasible. However, previously-suggested location tracking mainly relies on at least one of the three following fundamental requirements:

(1) The tracker must either know the mobile device user's initial location (the exact GPS coordinates) or have substantial prior knowledge of the area through which the user is traveling. For example, the tracker assumes that the user is traveling through a small set of known routes.

(2) The tracker must measure a set of features, e.g., power consumption, for different potential routes in advance and construct a specific training dataset.

(3) The sensory data must be continuously collected at a high sampling rate, e.g., 30 Hz, which is significantly higher than the sampling rate needed for a majority of benign applications.

The first two requirements significantly limit the tracker's ability to locate the user in realistic scenarios, and the third can raise suspicion, making detection easier. Even with these requirements, previous tracking attempts offer only a rough estimation of the user's trajectory.

Thus, there is a need for a system that accurately tracks a user of a mobile device when location services are turned off without raising suspicions from the user.

SUMMARY OF THE INVENTION

According to various embodiments, a method for locating the user of a mobile device without accessing global position system (GPS) data is disclosed. The method includes determining the last location that the user was connected to a wireless network. The method further includes compiling publicly-available auxiliary information related to the last location. The method additionally includes classifying an activity of the user to driving, traveling on a plane, traveling on a train, or walking. The method also includes estimating the location of the user based on sensory and non-sensory data of the mobile device particular to the activity classification of the user.

According to various embodiments, a system for locating the user of a mobile device without accessing global positioning system (GPS) data is disclosed. The system includes a processor programmed to determine the last location that the user was connected to a wireless network and compile publicly-available auxiliary information related to the last location. The processor is further programmed to classify an activity of the user to driving, traveling on a plane, traveling on a train, or walking. The processor is also programmed to estimate the location of the user based on sensory and non-sensory data of the mobile device particular to the activity classification of the user.

According to various embodiments, a non-transitory computer-readable medium having stored thereon a computer program for execution by a processor configured to perform a method for locating the user of a mobile device without accessing global positioning system (GPS) data is disclosed. The method includes determining the last location that the user was connected to a wireless network and compiling publicly-available auxiliary information related to the last location. The method further includes classifying an activity of the user to driving, traveling on a plane, traveling on a train, or walking. The method additionally includes estimating the location of the user based on sensory and non-sensory data of the mobile device particular to the activity classification of the user.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which.

DETAILED DESCRIPTION OF THE INVENTION

According to various embodiments, disclosed herein is a system and method for accurately tracking a user of a mobile device when all location services are off, without any of the previously mentioned requirements. The user's initial location or a small set of potential travel routes are not required, nor are construction of attack-specific databases based on measuring several features. Data is also not collected at a high sampling rate. For instance, a sampling rate of 0.1 Hz would be sufficient to track the user when driving, based on a demonstration discussed below. This allows for determining the location of a user without prior knowledge of the user's initial location or set of routes the user travels, and detection services based on high sampling frequency are ineffective.

The system and method disclosed herein may be referred to as "PinMe", a location mechanism that enables accurate location of a mobile device user based on sensory and non-sensory data along with publicly available auxiliary information.

Demonstrations performed show how different types of seemingly benign non-sensory data, e.g., the mobile device's time zone and network status, and sensory data, e.g., air pressure and heading, can offer sensitive information for location of the user.

Five nonlimiting examples of publicly-available auxiliary information (public maps, transportation timetables, airports' specification databases, weather reports, and trains' heading dataset) are introduced that can be used in conjunction with mobile device's data to aid in determining the location of a user.

Unlike previous systems that determine location which focus on a single activity, e.g., driving, with the disclosed system, a user can be located when (i) traveling on a plane, (ii) walking, (iii) traveling on a train, and/or (iv) driving. PinMe is the first mobile-based user location mechanism that aims to locate the user while undertaking different activities.

Figure 1:
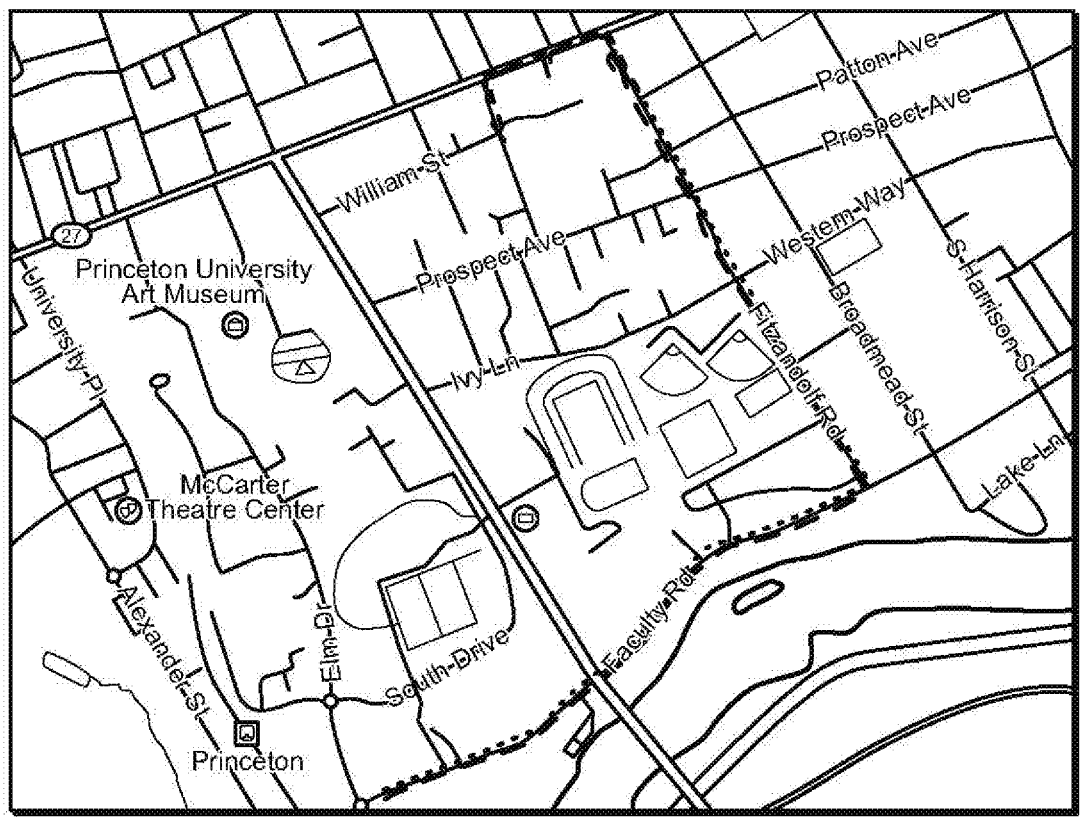
FIG. 1 is a map illustrating estimating a user's trajectory without accessing GPS data according to an embodiment of the present invention.

In order to evaluate the accuracy of the disclosed location mechanism, real-world data was collected using three devices (iPhone 6, iPhone 6S, and Galaxy S4 i9500). The accuracy of PinMe was evaluated for estimating the user's location using two real-world datasets. Unlike previous systems, PinMe is able to accurately and uniquely return a trajectory that is as accurate as GPS-based trajectory. FIG. 1 illustrates that PinMe could find and return the user's trajectory without accessing GPS data, showing a comparison of the location tracking through PinMe and GPS.

In summation, PinMe offers a comprehensive (i.e., covering multiple activities) location tracker that minimizes the need to have prior knowledge about the user, removes the need for building specific datasets, and uses the interdependence between seemingly independent activities to obtain an accurate user trajectory. The end-to-end evaluation demonstrates that PinMe works accurately (comparable to GPS) in real-world scenarios. Detecting the location tracker may be challenging due to its robustness against potential sources of noise and the low sampling rate required for the attack.

Problem Definition

Today's mobile devices are equipped with several low-power, high-precision sensors and powerful processors that enable them to continuously collect and process environment-related data. As a result, a modern mobile device carries several types of valuable data. Such data can be processed to reveal sensitive information about the phone's user. For example, the contextual information attached to movement traces may conveys information about the user's interests, activities, and even relationships.

Launching an attack against location privacy can expose the user to unwanted advertisement, spams, or scams. Moreover, it can lead to several consequences, ranging from the uncomfortable feeling of being monitored to unwanted disclosure of personal activities or even actual physical harm. For example, it may be embarrassing for a user if their relatives find out that they went to certain places, such as an HIV clinic or an abortion clinic. While these consequences are a direct result of manual inspection of leaked location-related information, several recent research efforts have investigated the feasibility of extracting other valuable information from the user's location-related information. For example, early research work in this area explored the possibility of inferring information about the user's habits and detecting places important to the user (such as their home or office) from GPS traces.

Although the importance of preventing location services, e.g., GPS, from leaking unwanted information has become clear, the extent of location-related information that can be inferred from presumably non-critical data, such as movement-related data, e.g., acceleration and heading, and environment-related data, e.g., air pressure, is neither well-known nor well-understood.

System Overview

Figure 2:
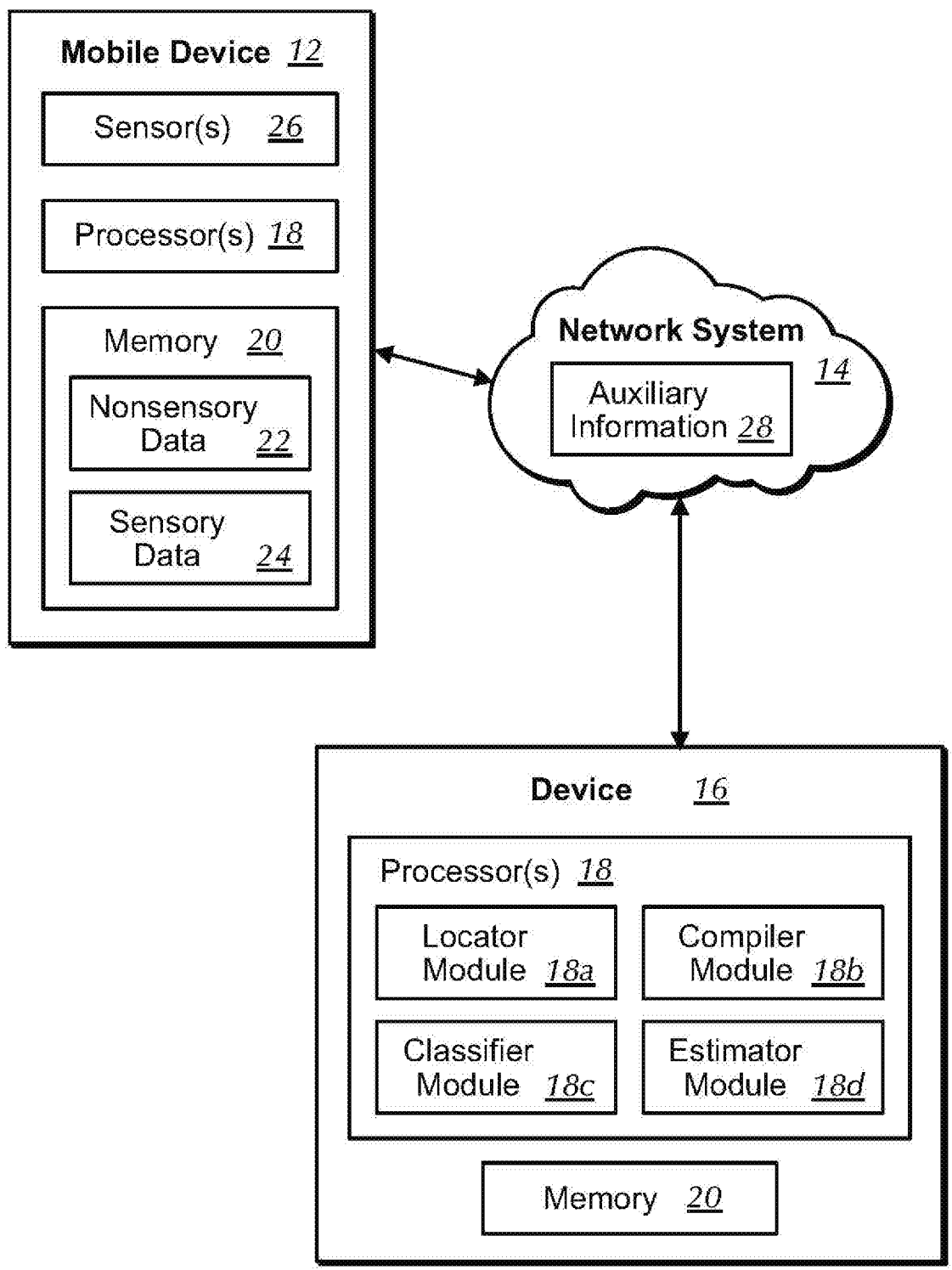
FIG. 2 is a block diagram of a system for tracking a mobile device user's location according to an embodiment of the present invention.

FIG. 2 illustrates a system 10 configured to track a mobile device user's location according to an exemplary embodiment of the present invention. The system 10 includes a mobile device 12 of the user, a network system 14, and a device 16 for tracking the location of the user. In an alternative embodiment, the mobile device 12 and device 16 may be the same device.

Mobile device 12 may be a mobile phone, smart phone, smart watch, or tablet computer, or other mobile processing device as nonlimiting examples. Mobile device 12 may also be included in a vehicle, or be the vehicle itself. Mobile device 12 includes one or more processors 18 for performing specific functions and memory 20 for storing those functions. For instance, the memory 20 stores both non-sensory data 22 and sensory data 24, to be discussed in further detail below. The mobile device 12 may include one or more sensors 26 for capturing the sensory data 24, such as a gyroscope, an accelerometer, a magnetometer, and a barometer, as nonlimiting examples. The non-sensory data 22 and sensory data 24 may also be uploaded to the cloud through the network system 14.

The device 16 for tracking the location of the user may be implemented in a variety of configurations including general computing devices such as but not limited to desktop computers, laptop computers, tablets, network appliances, and the like. The tracking device 16 may also be implemented as smart phone or other network based device having access to the network system 14. Device 16 includes one or more processors 18 for performing specific functions and memory 20 for storing those functions. The processor 18 may include a locator module 18a for determining the last location that the mobile device 12 user was connected to the network system 14. The processor 18 may also include a compiler module 18b for accumulating auxiliary information related to the user's last location. The processor 18 additionally includes a classifier module 18c for classifying the activity of the user and an estimator module 18d for estimating the location of the user based on the non-sensory data 22, sensory data 24, and activity classification of the user.

The network system 14 may be implemented as a single network or a combination of multiple networks. Network 14 may include wireless telecommunications networks, WiFi, or other communication networks. Network 14 is utilized by the device 16 to access the non-sensory data 22 and sensory data 24 from the mobile device 12, as well as auxiliary information 28, to be discussed in more detail below.

Acquiring Data

A mobile device's non-sensory data 22 and sensory data 24, which are required for the location tracker, may be obtained using one of the two following approaches:

(1) Approach 1: Utilizing a Malicious Application

Smartphones 12 are characterized by their ability to run third-party applications. Both Android and iOS offer hundreds of thousands of applications through their application markets. Such markets benefit developers by simplifying application sales and distribution. The existence of huge application markets might also enable cyber criminals to distribute a malicious application in an attempt to steal personal information stored on the phone, e.g., credit card numbers and personal photos. Fortunately, such critical information is commonly protected by the smartphone's operating system, and users are also very careful about sharing their personal information with third parties. However, several types of non-sensory data 22 and sensory data 24 stored on the smartphone are either loosely-protected or not protected at all. For instance, gyroscope, accelerometer, barometer, and magnetometer measurements, or other sensor 26 measurements are accessible by an application installed on the smartphone 12 without requiring the user's approval. As a result, an application that is installed on the smartphone 12 and runs in the background can continuously capture such data without the user's knowledge.

(2) Approach 2: Accessing a Presumably Trusted Application Server

Several trusted applications upload their data 22 and 24 to the cloud. For example, a majority of fitness monitoring applications continuously collects and uploads a user's data to the cloud. The collection of the data in the cloud enables the user to access and share fitness statistics with family, friends, and peer groups. A recent report by the mHealth development industry estimates that there are about 100,000 applications dedicated to health and fitness. Such applications can inconspicuously collect and upload a significant amount of valuable non-sensory data 22 and sensory data 24, which can be post-processed to infer critical information about the user.

Sources of Information

PinMe exploits two main sources of information: (1) non-sensory data 22 and sensory data 24 collected by the mobile device 12, and (2) publicly-available auxiliary information 28.

(1) Mobile Device Non-Sensory 22 and Sensory Data 24:

An application installed on a mobile device 12 may obtain several types of non-sensory 22 and sensory data 24 without requesting a user's approval. Non-sensory data 22 provide general information about the device, e.g., the version of the device's operating system, current time zone, IP address, the amount of available storage, and network status. Table 1 summarizes different nonlimiting examples of non-sensory data 22 that PinMe may use to locate the user during different activities, along with a short description of each.

TABLE 1

MOBILE DEVICE NON-SENSORY DATA 22

| Non-Sensory Data | Description |
| --- | --- |
| Time zone (TZ) | Specifies the device's current time zone (i.e., a region including the cities/states that have the same time) |
| Device's address (IP) | Provides the phone's IP address when it is connected to the Internet |
| Network status (NS) | Specifies whether the smartphone is connected to a WiFi or a cellular network |

In addition to the non-sensory data 22, sensory data 24 collected by the mobile device's built-in sensors 26 provide valuable information about the user's movements and the environment in which the mobile device 12 is located. Table 2 includes different nonlimiting examples of sensors 26 that are accessed by PinMe and sensory data 24 provided by each sensor.

TABLE 2

MOBILE DEVICE SENSORY DATA 24

| Sensor | Sensory Data |
| --- | --- |
| Accelerometer | Magnitudes of the acceleration in three-dimensional space |
| Magnetometer | Angle between device's actual orientation relative to true north (heading) |
| Barometer | The environment's air pressure |

(2) Publicly-Available Auxiliary Information 28:

The disclosed user location mechanism uses several types of auxiliary information 28 to narrow the area of interest. In particular, it utilizes five main types of information 28: (i) public maps, (ii) weather reports, (iii) airports' specifications database, (iv) trains' heading dataset, and (v) transportation timetables. However, the PinMe is not limited solely to these five types of auxiliary information 28.

(i) Public Maps:

The proposed mechanism uses two widely known map types: Navigational maps and Elevation maps.

A navigational map mainly depicts roads, highways, and transportation links. Such a map can specify a large set of possible routes through which the user can travel. As a nonlimiting example, PinMe may use maps found in OpenStreetMap (OSM). OSM maps can be downloaded as Extensible Markup Language (XML) files that can be easily processed and modified.

An elevation map contains the elevation, i.e., the height above or below the Earth's sea level, of all points on the Earth's surface. Several commercial and government services provide comprehensive elevation data of the world surface (such as Google Map API or US Geological Survey Maps, respectively, as nonlimiting examples). For instance, the Google Map API offers a free and publicly-available interface that may be used by developers to fetch the elevation of a point of interest, given its longitude and latitude.

(ii) Weather Reports:

Weather reports offer different types of information collected by weather stations. As a nonlimiting example, weather reports provided by The Weather Channel may be used. These reports include temperature, humidity, and air pressure readings at weather stations, and the actual elevation of the weather station. PinMe uses weather reports to estimate the elevation of the mobile device using its air pressure reading. The use of weather reports is essential for accurately estimating the elevation of the mobile device since the air pressure readings are highly dependent on both elevation and weather conditions.

(iii) Airports' Specifications Databases:

Airports' specifications databases include elevation information, GPS coordinates, and the time zones of airports around the world. As a nonlimiting example, PinMe may use OpenFlights, which includes information for 9,541 airports.

(iv) Trains' Heading Databases:

Trains' heading database includes the trains' directions at each station. This database may be constructed from publicly available maps, such as Google Map as a nonlimiting example. For each train station considered, different potential movements directions are extracted based on the illustration of the stations' tracks on the map. It is notable that each track in a station can have two possible headings corresponding to a train entering and leaving the station.

(v) Transport Timetables:

Transport timetables contain information about service times to assist passengers in planning their trip. A timetable lists the times when a service is scheduled to arrive (depart) at (from) specified locations. The two most common types of transport timetables are flight and train timetables. These timetables are often available in a variety of electronic formats, e.g., PDF files, and are commonly posted on airports'/stations' websites. They are also accessible through various APIs.

Main Processing

Figure 3:
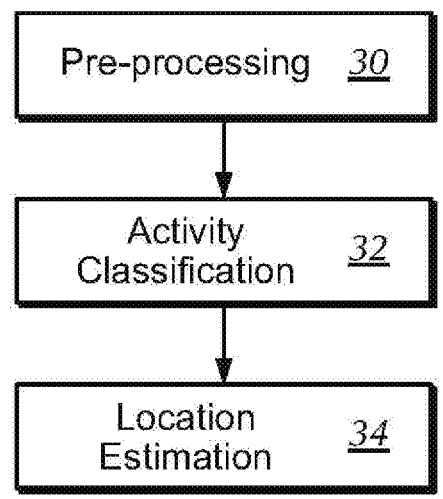
FIG. 3 is a flow chart illustrating the main steps for tracking a mobile device user's location according to an embodiment of the present invention.

PinMe may be implemented using programs such as Python and Matlab. FIG. 3 illustrates the three main steps: (1) pre-processing 30, (2) activity classification 32, and (3) location estimation 34. Table 3 includes a simplified pseudo-code of the disclosed location mechanism. Each step is described in more detail below.

TABLE 3

PINME PROCESSING

Given: The smartphone's sensory data (D), non-sensory data (IP, NS, and TZ), and all sources of publicly-available auxiliary information (allAux: public maps, weather reports, airports' specifications databases, trains' heading databases, transport timetables)
//Step 1: Pre-processing
lastWiFiIP ←findLastWiFiIP(NS,IP)
city ←IPGeolocation(lastWiF iIP)
aux ←getAux(allAux,city)
chunks[ ] ←streamPartitioning(D)
//Step 2: Activity classification
acts[ ] ←activityClassifier(chunks[ ])
//Step 3: Location estimation
for each activity in acts[ ]
[city, loc[i]] ←Estimator(chunks[i], acts[i], aux, city)
end
return loc[ ]

(1) Pre-Processing 30

Figure 4:
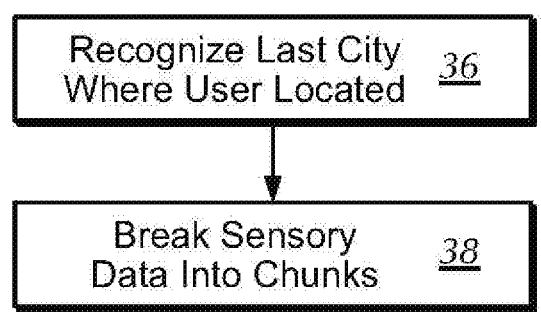
FIG. 4 is a flow chart illustrating the steps for pre-processing according to an embodiment of the present invention.

Pre-processing 30 includes two steps as illustrated by FIG. 4. (i) At step 36, PinMe first recognizes the last city in which the user was connected to a WiFi network 14 and gets the required sources of auxiliary information 28 for the potential city of interest. (ii) Second, at step 38, it breaks the sensory data 24 into several chunks so that each chunk is associated with a single activity.

(i) Inferring the City 36

When the mobile device 12 is connected to a WiFi network 14, IP geolocation techniques may process the device's current IP address and return the city in which the mobile device 12 is located. Although such techniques may accurately locate the mobile device 12 when it is connected to a WiFi network 14, they usually fail to locate it when connected to a cellular Internet network 14.

As nonlimiting examples, both iOS and Android allow an installed application to determine whether the mobile device 12 is connected to a WiFi or a cellular network 14. In order to find the last city in which the user was connected to a WiFi network 14, PinMe processes the previous readings of the mobile device's Network Status (NS) and IP address to find the last IP address of the mobile device 12 when it was connected to a WiFi network 14, and feeds that IP address to IPGeolocation( . . . ). Then, PinMe obtains different types of auxiliary information 28 about the city, e.g., its maps. PinMe does not assume that the user remains in the same city. However, it starts tracking the user from that city. In fact, the user's current city becomes regularly updated based on his past movements.

(ii) Data Stream Partitioning 38

In the pre-processing step, PinMe also breaks the long data stream collected over a long time period, e.g., a day, into data chunks so that each chunk only includes the data associated with one activity. Based on empirical analyses, a simple pattern in the acceleration data can indicate that a new activity has commenced: in the transition from one activity to another, the accelerometer measures a series of large absolute acceleration readings (larger than 25 m/s$^2$) in a short time frame due to the fact that there is always a transition from standing (sitting) position to sitting (standing) position between two activities. This is the pattern PinMe uses to break the data stream into small data chunks. Unfortunately, a similar pattern might be present in the acceleration data collected during a single activity, e.g., when the user suddenly moves or falls. Therefore, it is possible that PinMe falsely detects the start of a new activity even when the user's activity has not changed. However, this does not negatively impact the accuracy of the location mechanism because as described later, for all activities, the activity classifier accurately detects the user's activity and PinMe can merge consecutive data chunks into one data chunk when the user's activity has not changed.

(2) Activity Classification 32

In this step, the activity classifier aims to specify the mobile device 12 user's activities. It is assumed that the user takes part in one of the four activities mentioned earlier: driving, traveling on a plane, traveling on a train, and walking. To classify these activities, two classification methods have been implemented: (i) a machine learning based method that relies on building models to label the user's activities, and (ii) a specifically-tailored method designed to deduce the user's activities based on the physical characteristics of each activity. The activity classifiers utilized in PinMe appear to be the first activity classification mechanisms that use air pressure data as a primary source of data for activity classification, and the first to use macro-level features, e.g., the number of turns and the rate of change during a turn, of heading data. An examination of real-world data shows that air pressure and heading can offer valuable discriminatory information for activity classification.

Figure 5:
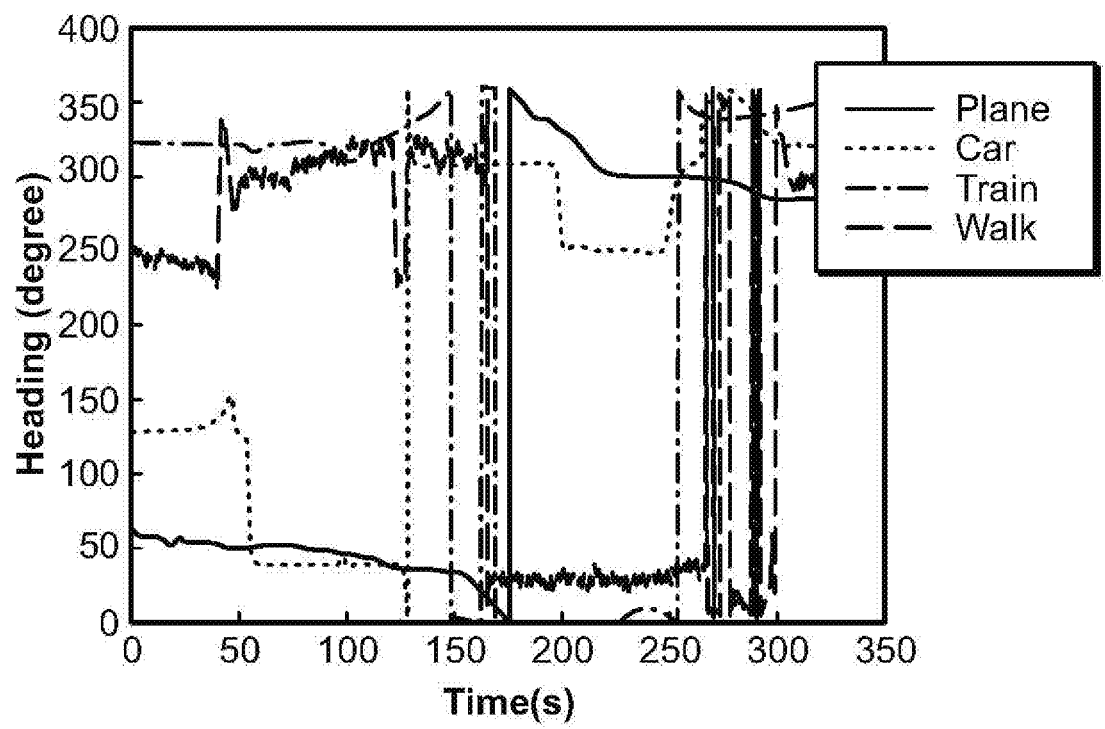
FIG. 5 is a graph illustrating the mobile device's heading changes in four data chunks collected during different activities according to an embodiment of the present invention.

FIG. 5 illustrates how the mobile device's heading changes in four data chunks collected during different activities. Among all activities, traveling on a train is the only one in which the smartphone observes no significant change in heading data. Note that heading data are measured clockwise from true north and vary from 0° to 359°.

Figure 6:
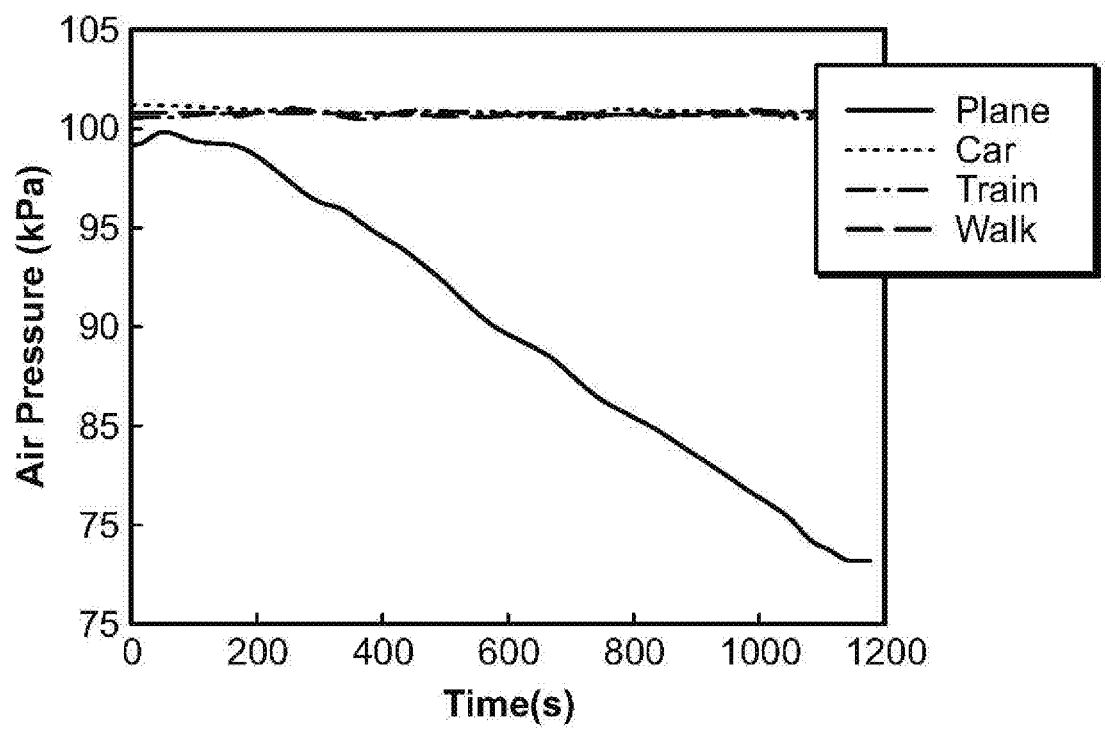
FIG. 6 is a graph illustrating how air pressure changes during different activities according to an embodiment of the present invention.

FIG. 6 shows how air pressure changes during different activities. Traveling on a plane is the only activity in which there is a fast significant drop in the environment's air pressure.

(i) Method 1: Machine Learning-Based Classification

Figure 7:
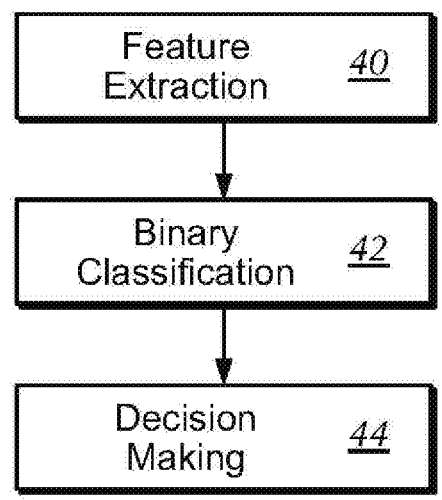
FIG. 7 is a flow chart illustrating the steps for machine-learning based classification according to an embodiment of the present invention.

One approach to implementing an activity classification mechanism is to devise a scheme based on a supervised machine learning method, which builds a model using labeled training data. The training dataset used for activity classification is not attack-specific (the required data may be collected using one's own mobile device 16 while traveling through unknown paths). This mechanism consists of three steps as illustrated by FIG. 7: (a) feature extraction 40, (b) binary classification 42, and (c) decision making 44. Upon receiving a data chunk, the feature extraction step 40 generates a feature vector. This vector is then sent to four binary classifiers, each trained to only detect a single activity 42. Finally, the decision making step 44 returns the user's activity based on the outputs of the binary classifiers.

(a) Feature Extraction 40

A variety of features that may be extracted from sensory data 24 and be used to classify various user activities. In the disclosed mechanism, several features extracted from heading and air pressure data along with a few previously-proposed acceleration-related features are used. Each feature vector includes: time-domain features (mean, median, and standard deviation) and frequency-domain features (principal frequency and spectral energy) extracted from each dimension of acceleration readings, time-domain features (mean, median, and standard deviation, and range) from air pressure, and macro-level features (number of turns and maximum rate of change in heading over 1-second windows) from magnetometer readings.

(b) Binary Classifiers 42

In order to implement binary classifiers, Linear Support Vector Machine (LSVM) may be used. LSVM is one of the simplest, yet powerful, binary classification methods. The basic concept behind an LSVM is to find a hyperplane that separates the n-dimensional data into two classes. When no prior knowledge about the dataset is available, LSVMs usually demonstrate promising results and generalize well. They construct a decision boundary with the largest possible distance to data points. The binary classifiers used in the disclosed scheme are trained so that each classifier can only recognize a single activity.

(c) Final Decision Making 44

The final decision making step receives the classifiers' outputs, and returns an output as follows: if only one classifier detects the activity, it returns the activity associated with that classifier, otherwise, it returns a message stating that the activity is not recognized.

(ii) Method 2: Specifically-Tailored Method

In addition to the machine-learning based method, a simple, yet accurate, classification method may be developed. The simple tailored method classifies the user's activities based on each activity's physical characteristics. Several data streams collected by the mobile device are examined during different user activities. For each activity, a set of characteristics that only pertains to that activity are extracted. Table 4 summarizes these characteristics.

TABLE 4

DISCRIMINATORY CHARACTERISTICS OF EACH ACTIVITY

| Activity | Characteristics |
| --- | --- |
| Driving | Irregular positive (negative) accelerations as the driver accelerates (brakes) |
| | Specific changes (around 90 degrees) in the smartphone's heading as the car turns |
| Traveling on a plane | Rapid changes in the time zone |
| | Significant increase/decrease of air pressure in a short time frame |
| Traveling on a train | Regular positive (negative) accelerations in one direction as the train leaves (reaches) a station |
| | No significant changes in the smartphone's heading |
| Walking | Very frequent periodic acceleration changes in one direction, no matter how the device is held |

(3) Location Estimation 34

In order to estimate the user's location, four estimators are implemented, referred to as location estimators. Upon detection of the user's activities (acts[ ]) using the activity classifier, for each activity, PinMe calls Estimator( . . . ) that executes one of the four location estimators to find the user's location. For each location estimator, Table 5 summarizes the required non-sensory/sensory data 22/24 and auxiliary information 28 given to it and the outputs provided by each estimator. The four location estimators are described in more detail below.

TABLE 5

REQUIRED NON-SENSORY/SENSORY DATA AND AUXILIARY INFORMATION GIVEN TO EACH LOCATION ESTIMATOR AND OUTPUTS PROVIDED BY EACH ESTIMATOR

| Location Estimator | Inputs | Outputs |
| --- | --- | --- |
| Estimator 1: carTracker | Air pressure, heading, public maps, and weather reports | The initial and last locations and cities, and the car's estimated trajectory |
| Estimator 2: planeTracker | Air pressure, acceleration, TZ, weather reports, airports' specifications databases, and flight timetables | The destination and departure airports |
| Estimator 3: trainTracker | Acceleration, heading, train timetables, and trains' heading databases | The destination and departure stations |
| Estimator 4: walkingUserTracker | Air pressure, acceleration, heading, weather reports, and public maps | The user's last location and trajectory |

Figure 8:
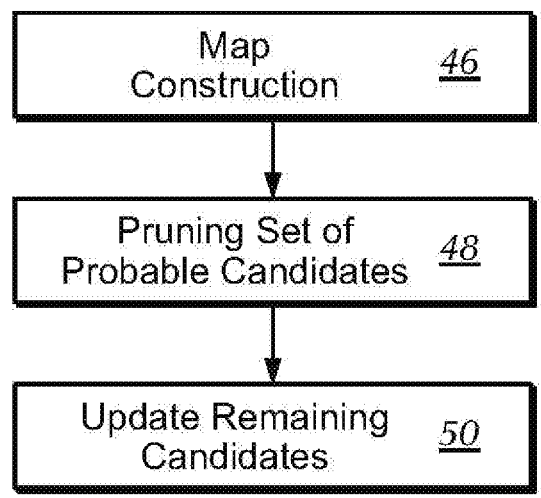
FIG. 8 is a flow chart illustrating the steps for utilizing the carTracker estimator according to an embodiment of the present invention.

(i) Estimator 1: carTracker: Unlike conventional methods that use very noisy accelerometer measurements, this estimator relies on the sensory data 24 collected by the magnetometer and barometer (heading and air pressure) to provide a very accurate tracking mechanism. It has three main steps as illustrated by FIG. 8:

Step 1: Map Construction 46

Prior to tracking the user, PinMe constructs a labeled directed graph G using both elevation and navigational maps of the city so that its vertices and edges represent the intersections and roads between intersections, respectively. Labels of vertices are the elevation of the intersections extracted from the navigational map and the angle between roads connecting to that intersection.

Step 2: Pruning Set of Probable Candidates 48

At each moment of time, the estimator has an array of trees (the set of probable paths with different starting points, referred to as P) where each tree represents a sequence of intersections on the navigational map. Prior to the initializing the location tracking, this array contains all vertices of G, indicating that the first turn can be at any intersection. Upon the detection of a turn (e.g., an almost 90-degree change in the heading data), the estimator prunes and updates the set of trees as follows. For each probable path (each tree in set P), it drops the path if all neighbors of its last vertex do not meet the following conditions: the elevation or relative changes in the heading direction of all neighbors (represented as labels of vertices in graph G) do not match their values extracted from sensory data 24.

Step 3: Updating the Remaining Candidates 50

At each turn, if a tree is not dropped from the set, the estimator adds all neighbors (intersections) that meet the above-mentioned conditions to the tree. Eventually, it sorts paths in P based on their error, defined as the weighted sum of absolute differences between the extracted features from the sensory data 24 and their actual values reported in navigational/elevation data, and returns the most probable path from the set (the path with the lowest error).

Although the number of intersections of a city is large, experimental results illustrate that the number of intersections that can be a part of a candidate path drops extremely fast from thousands to only a few after the first few turns. As a result, the size of set P is reduced quickly as the estimator removes many impossible candidates when they become inconsistent with new data.

Although there is a well-known physics equation for estimating elevation (relative to sea level) based on air pressure measurements alone, it does not provide an accurate estimation of the elevation in practice since barometer measurements significantly depend on weather conditions. To accurately estimate the elevation ($H_{turn}$) of a turn point, given the air pressure measured at the point ($P_{turn}$), PinMe first extracts the air pressure ($P_{station}$), elevation ($H_{station}$), temperature information (T), and humidity (indicated by a constant C) at city's weather station, provided by its weather report, and then uses the following physics equation:

$$H_{turn} = H_{station} + \frac{T}{C} \ln\left(\frac{P_{turn}}{P_{station}}\right)$$

Figure 9:
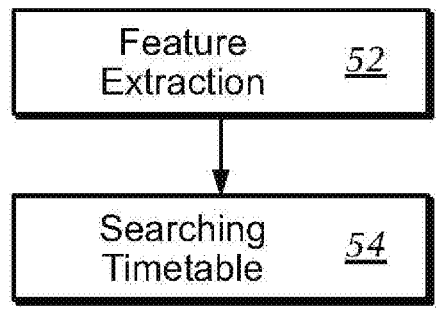
FIG. 9 is a flow chart illustrating the steps for utilizing the planeTracker estimator according to an embodiment of the present invention.

(ii) Estimator 2: planeTracker:

PlaneTracker has two main steps as illustrated by FIG. 9.

Step 1: Feature Extraction 52

This estimator first extracts three features from the raw data provided by the mobile device 12: (a) flight time data (takeoff and landing times and flight duration), (b) TZ and elevation of the departure airport, and (c) TZ and elevation of the destination airport. In order to extract these features from the raw data, the estimator first recognizes different aviation phases of the flight (pre-flight, takeoff, cruising, descending, landing, and taxiing to the gate) by processing acceleration and elevation data collected by the mobile device during the flight. Then, it calculates the flight duration as the time difference between the pre-flight phase (i.e., when the plane leaves the gate at the departure airport) and taxiing phase (i.e., when the plane reaches the gate at the destination airport). Moreover, it stores the device's air pressure and TZ in both the pre-flight and taxiing phases. Afterwards, it calculates the elevations of both departure and destination airports, given the weather report (including the air pressure reading at city's weather station and its elevation data). Then, it searches through the airports' specifications database to find the flight routes, which have the following characteristics: (a) the TZ of both destination and departure airports reported by the smartphone matches the ones reported in the database, (b) the difference between elevation measured from air pressure data and elevation extracted from the database is less than a small threshold, e.g., $T_{elevation}$=5 m, and (c) the difference between flight duration measured from acceleration data and flight duration extracted from the database is less than a certain threshold, e.g., $T_{duration}$=1 h.

Step 2: Searching Through the Timetable 54

Given timetables of probable departure/destination airports, planeTracker returns the routes for which both takeoff time and landing time almost match their corresponding times provided by timetables, e.g., $\Delta T_{landing}, \Delta T_{takeoff}$<1 h, where $\Delta T_{landing/takeoff}$ is the difference between landing/takeoff times extracted from sensory data 24 and their expected values in timetables.

Figure 10:
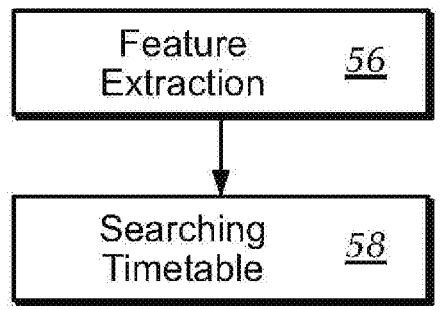
FIG. 10 is a flow chart illustrating the steps for utilizing the trainTracker estimator according to an embodiment of the present invention.

(iii) Estimator 3: TrainTracker:

Acceleration data can reveal different transportation phases, e.g., when the train leaves or approaches a station, and the combination of acceleration and heading data provides an approximation of the train's heading. This estimator has two main steps as illustrated by FIG. 10.

Step 1: Extracting Features 56

The estimator first extracts three features from the raw acceleration and heading data: (a) travel intervals (an array T), defined as the difference between the time the train leaves a station and the time it reaches the next station, (b) departure time $T_{departure}$ that represents when the train left the first station, and (c) train's heading, i.e., an approximation of the direction of the train's movement at the first station.

Step 2: Searching Through the Timetable 58

After extracting the above-mentioned features from the raw data, this estimator searches the timetables of city's stations to find the most probable route. It first constructs $T_{train}$ for all trains that already left or will leave the current city around the departure time (within $T_{departure}$−1 h to $T_{departure}$+1 h) as follows: each $T_{train}$ is itself an array including travel intervals for a single train. Then, for each $T_{train}$ in the list, it computes the difference between travel intervals extracted from the sensory data (T) and $T_{train}$, i.e., $D=\sum_{n=1}^{length(T)}|T[i]-T_{train}[i]|$. If the difference between T and $T_{train}$ is below a certain threshold (i.e., D<2 mins×length (T)), the route corresponding to $T_{train}$ is added to the set of probable routes (P). Then, the estimator prunes P by removing routes for which the difference between the trains' heading extracted from the sensory data and the actual value of heading reported in trains' heading database is above a certain threshold (e.g. 30 degrees). Finally, from the remaining routes, it returns a single route corresponding to the lowest D in the set.

Figure 11:
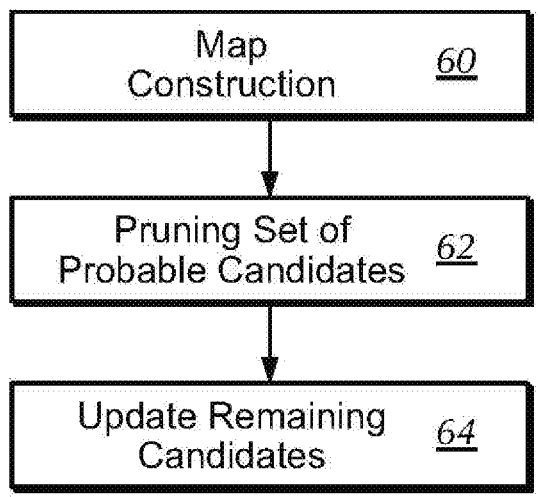
FIG. 11 is a flow chart illustrating the step for utilizing the walkingUserTracker estimator according to an embodiment of the present invention.

(iv) Estimator 4: WalkingUserTracker:

This estimator assumes that the user walks through the walking areas (roads or sidewalks) of the navigational map. At least two different versions of the estimator may be implemented. The first version searches through the whole map to find the user's trajectory. However, to find the initial location of this activity, the second version only considers a small area (300 m×300 m) on the map around a given location (in real-world scenarios, this location is determined by a previous activity). The second version has three steps (the second version is similar but only considers a smaller set of nodes to find the initial point) as illustrated by FIG. 11.

Step 1: Map Construction 60

Prior to the attack, walkingUserTracker constructs a graph G similar to the one generated for Estimator 1: carTracker, with a slight difference: the graph also has a label on each edge that represents the length of the corresponding road extracted from the navigational map. Similar to carTracker, the estimator maintains an array of trees (the set of probable paths with different starting points, referred to as P) where each tree represents a sequence of intersections on the navigational map.

Step 2: Pruning the Set of Probable Candidates 62

The estimator extracts the steps and their direction from the raw acceleration and heading data and elevation of intersections from air pressure readings. Upon the detection of a turn (e.g., an almost 90-degree change in the heading data), the estimator updates the set of trees as follows. For each probable path, it drops the path if all neighbors of its last vertex do not meet at least one of the following conditions: (a) all labels of edges that connect the last vertex to it neighbors (D[i]s) do not match the estimation of the travelled distance calculated based on the number of steps (for example, all D[i]s are not within the range of 0.4 m×# steps to 1.2 m×# steps), or (b) the elevation or relative changes in heading direction of neighbors do not match their values extracted from sensory data.

Step 3: Updating the Remaining Candidates 64

At each turn, if a tree is not eliminated, the estimator extends it by adding all neighbors (intersections) that meet the above conditions. This estimator sorts paths P based on their error, defined as the weighted sum of absolute differences between the extracted features from the sensory data and their actual values given by maps, and returns the path with the lowest error.

Although this estimator uses an estimation of the distance walked by the user to find the trajectory, it can also accurately estimate the user's step size upon the detection of a unique path. It uses the information gathered in the last sidewalk/road (e.g., total number of steps) along with information offered by the navigational map (e.g., the total length of the last sidewalk/road) to adaptively estimate the user's step size. Upon the detection of a unique trajectory, the estimation of the step size enables the estimator to accurately estimate the user's location on the road.

Interdependence of Activities

Four different independent estimators were developed for tracking the user during four different activities. Although the user's activities may seem independent of each other at first glance, there exists interdependence between them due to physical constraints imposed by the world and the user's movement.

In particular, two observations are made. First, the users always walk between other activities (driving, traveling on a train, and traveling on a plane), and therefore, certain sequences of activities are not feasible. For example, the user cannot get on a plane as soon as he stops driving. This helps the classifier to remove impossible cases.

Second, the final location of the user after performing each activity roughly determines the initial location of the next activity. However, since the precision of the estimated location determined by different estimators might differ from each other, combining the results from different estimators to get an accurate trajectory is not usually straightforward.

For example, consider the following scenario: a user takes a flight that lands at airport A, then walks for a few hundred meters to reach the user's car, and eventually drives home from the airport. In order to track the user, PinMe utilizes flightTracker, walkingUserTracker, and carTracker, respectively. FlightTracker returns departure and destination airports, whereas carTracker and walkingUserTracker return a trajectory with an accuracy comparable to GPS. If PinMe relies on the assumption that the initial location for each activity is accurately determined by the previous activity, then it fails to provide an accurate estimation of the user's trajectory in the above-mentioned scenario since the location returned by the first activity provides an inaccurate initial point for carTracker (the whole airport area is marked as a single point with fixed GPS coordinates on navigational maps).

However, the interdependence between activities still provides valuable pieces of information in this scenario. First, flightTracker returns the destination airport from which the current city can be identified even if the user has not connected to any WiFi network yet or is using an anonymous communication service, e.g., Tor. Second, the final location of the user after performing each activity can significantly bound the area of interest. This has been used in the end-to-end evaluation, to be discussed below, where the walkingUserTracker estimator assumes that the user's initial location, when the user starts walking, is within a small area around the final_location of the user estimated by carTracker.

Evaluation of an Exemplary Embodiment of the Present Invention

In this section, the data collection procedure is described according to an embodiment of the present invention. Then, the accuracy of PinMe is examined using real-world data.

(1) Data Collection Procedure

An embodiment of the disclosed location estimator was evaluated on three smartphones 12 (Galaxy S4 i9500, iPhone 6, and iPhone 6S). Each device 12 is equipped with an internal GPS device and several high-precision sensors 26 including, but not limited to, a 3/6-axis accelerometer, magnetometer, and barometer. As mentioned earlier, PinMe processes various types of sensory data 24 (air pressure, heading, and acceleration) and non-sensory data 22 (the device's TZ, IP, and NS). In order to collect the required data using Galaxy S4 i9500, an Android application was developed that continuously records the non-sensory/sensory readings 22/24 of the device 12. Moreover, a sensor data logger application was installed on both iPhone 6 and iPhone 6s, called Sensor-Log, which continuously records the required nonsensory 22 and sensory data 24. For the data collection procedure, sensory data 24 was collected at the sampling frequency of 5 Hz. In addition to the above-mentioned data, the applications installed on the smartphones 12 also collect GPS readings. GPS data was only used to evaluate the accuracy of PinMe in estimating the user's location (PinMe does not access GPS data).

Two datasets were constructed using real-world data. The first dataset includes several data chunks, i.e., sequences of consecutive readings of non-sensory/sensory data collected during one activity. The second dataset includes three non-sensory/sensory data streams collected by the three under-experiment smartphones for a whole day. Each dataset is briefly described below. During the collection of each data chunk, the smartphone's orientation was almost fixed; however, the actual orientation of the smartphone was unknown in all cases.

Dataset #1: This dataset consists of 405 data chunks collected during different user activities where each data chunk contains consecutive readings of air pressure, heading, acceleration, and the device's TZ, IP, and NS during each activity. Table 6 shows the number of collected chunks for each activity.

TABLE 6

NUMBER OF DATA CHUNKS IN DATASET #1 FOR EACH ACTIVITY

| Activity | Number of Data Chunks |
|---|---|
| Driving | 271 |
| Traveling on a plane | 4 |
| Traveling on a train | 30 |
| Walking | 100 |

Next, for each activity, how the real-world data was collected is briefly described.

(i) Driving: A user, carrying an iPhone 6, drove in three different cities. 271 data chunks were collected, where each chunk contains the smartphone's data during one driving period. Table 7 shows the cities in which the user drove, their populations, the state in which each city is located, and the number of collected data chunks for each city. To provide a fair evaluation, data chunks were collected from different areas of these cities (both dense and sparse areas).

TABLE 7

CITIES, THEIR POPULATIONS, STATE, AND NUMBER OF DRIVING CHUNKS FOR EACH CITY

| City Name | Population | State | Chunks |
|---|---|---|---|
| Princeton | 12307 | NJ | 105 |
| Trenton | 84308 | NJ | 111 |
| Philadelphia | 1.5 million | PA | 55 |

(ii) Traveling on a plane: Four data chunks were collected when the user traveled on four different airplanes on four different flight routes: (i) from Philadelphia to Dallas, (ii) from Dallas to New York, (iii) from College Station to Dallas, and (iv) from Dallas to College Station. All four data chunks were collected using iPhone 6S.

(iii) Traveling on a train: 30 data chunks were collected using an iPhone 6s when the user traveled on a train (10 chunks for Princeton Junction Station to New York, 10 chunks for Baltimore Penn Station to New York, and 10 chunks for Washington D.C. Union Station to New York).

(iv) Walking: 100 data chunks were collected when the user walked carrying an iPhone 6. These data chunks were gathered in Princeton.

Dataset #2: This dataset includes three data streams collected by three users while going through their regular daily activities. Two users were located in Princeton, N.J. and one user was located in Baltimore, Md. In order to construct this dataset, the users were asked to choose and carry one of the three under-experiment smartphones (Galaxy S4 i9500, iPhone 6, and iPhone 6S).

(2) Accuracy Evaluation

First, the accuracy of the two main steps of PinMe (activity classification and location estimation) was evaluated using Dataset #1. Then, Dataset #2 was used to provide an end-to-end evaluation.

(i) Step-by-Step Evaluation

The two activity classification methods discussed above were evaluated using Dataset #1. In the machine-learning based approach, 50% of the collected data chunks were used for training the binary classifiers, and the accuracy of the scheme was tested using data not used in the training phase. In the other approach, all data chunks were used to test the accuracy of the specifically-tailored method. Both methods provided a classification accuracy of 100%, where classification accuracy is defined as the ratio of correctly recognized activities to the total number of activities processed by the activity classifier. High classification accuracy was expected since each of the supported activities (driving, traveling on a plane, traveling on train, and walking) has unique physical characteristics that differentiate it from other activities.

Next, the accuracy of the four location estimators was examined to determine how accurately they can estimate the user's location.

Figure 12:
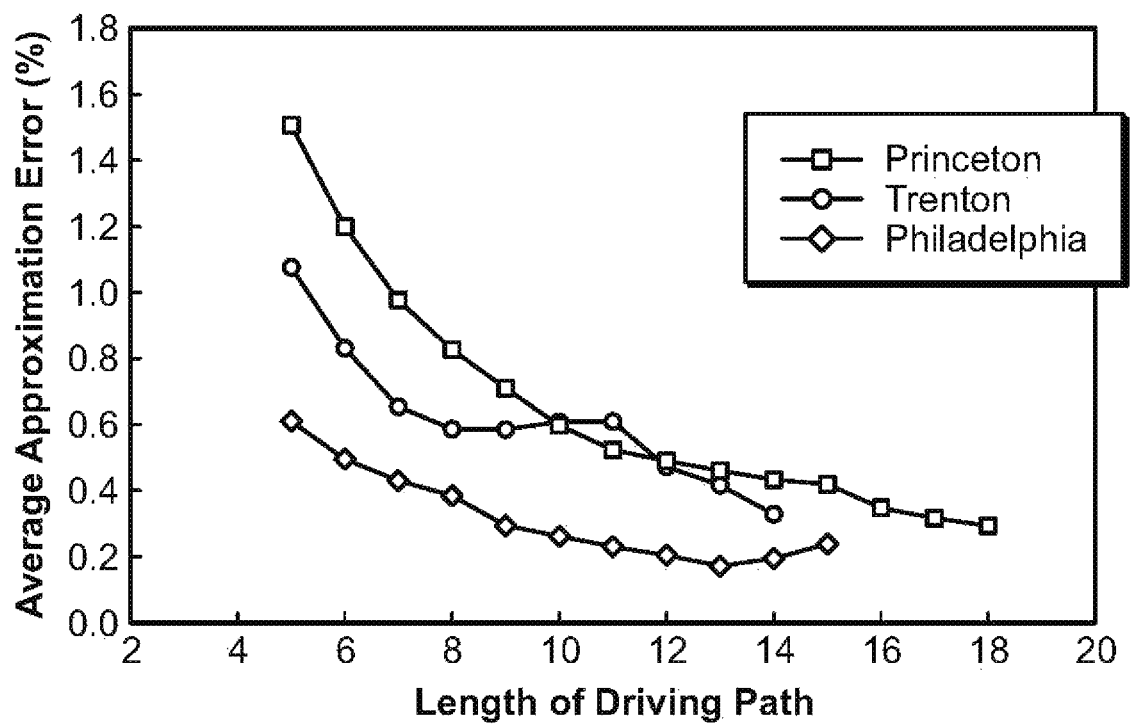
FIG. 12 is a graph illustrating the average approximation error with respect to the length of the driving path according to an embodiment of the present invention.

Estimator 1: carTracker: In order to evaluate the accuracy of carTracker, 271 data chunks from Dataset #1 were used, which were collected in three different cities shown in Table 7. Next, it was determined how accurately this estimator can locate the user when it returns the most probable driving path from the set of probable driving paths and how the size of the set changes with respect to the length of the driving path. FIG. 12 shows the average approximation error with respect to the length of the driving path, i.e., the number of routes the driver traverses in one driving period that is equal to the number of turns plus one. The approximation error is defined as the distance between the actual location (as provided by GPS sensor) and the estimated location (as estimated by PinMe) of the user, divided by the total traveled distance (computed by processing GPS readings). In the experiment, the length of the driving path varies between 5 and 18. As can be seen from FIG. 12, as the length of the driving path increases, the approximation error of the estimator typically decreases.

Figure 13:
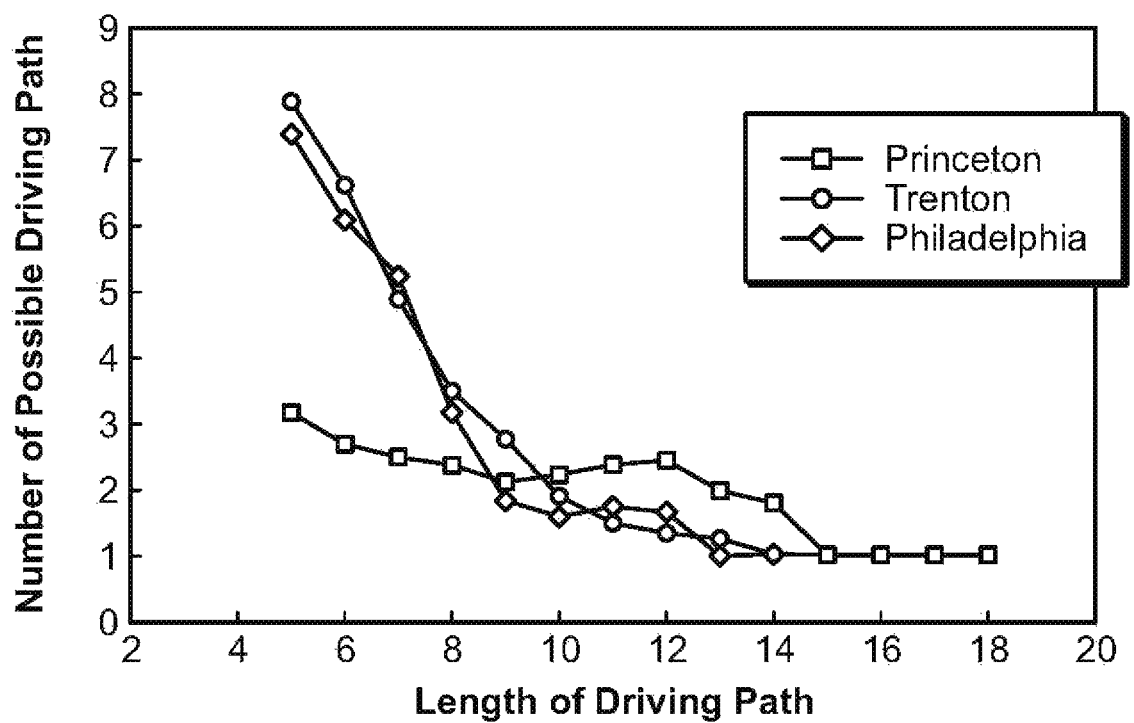
FIG. 13 is a graph illustrating the number of possible driving paths with respect to the length of the driving path according to an embodiment of the present invention.

How the number of possible driving paths decreases when the length of the driving path increases was examined. FIG. 13 illustrates the number of possible driving paths with respect to the length of the driving path. As can be seen, the number of possible driving paths drops rapidly as the length of the driving path increases. To sum up, as the length of the driving path increases, PinMe collects more information about the user's environment, and as a result, it is more likely to find a unique driving path on the map.

Estimator 2: planeTracker: The accuracy of planeTracker in finding departure and destination airports was examined using Dataset #1. As shown in Table 6, four data chunks were collected while traveling on a plane. Despite the existence of potential differences between the approximated values of takeoff time, landing time, and elevation, and their expected values reported in airports' specification database and flight timetables, planeTracker was able to accurately and uniquely return both departure and destination airports for all four flight routes.

For each of the four data chunks, it was examined how much the approximated takeoff time, landing time, and elevation readings extracted by processing the smartphone's sensory data differ from their expected values calculated by processing publicly-available auxiliary data (airports' specification database and flight timetables). It was noticed that: (i) the average difference between estimated elevation reported by the smartphone and the elevation extracted from airports' specification database was 2.3 m, (ii) the average difference between the estimated flight duration and the actual flight duration was 4% of the actual duration, (iii) the difference between approximated takeoff time and the takeoff time reported in the flight timetable (flight delay) was 17 minutes.

In addition to the above-mentioned analyses, the discriminatory power of the features extracted by planeTracker (flight duration, TZs, and elevations of both destination and departure airports) was also examined using Monte Carlo simulation methodology. Two scenarios were considered: (i) similar to above-mentioned real-world cases, both departure and destination airports are unknown and planeTracker returns the flight route (departure and destination airports), and (ii) the departure airport is known from a previous activity, e.g., driving to the airport, and the destination airport is only needed to be identified. For each scenario, 500 random flight routes were generated assuming that (i) for each route, the difference between the estimated flight duration and actual flight duration varies between 0% and 10% of the actual duration, and (ii) the difference between the estimated elevation reported by the smartphone and the elevation extracted from airports' specification database varies between 0 m and 5 m. planeTracker was slightly modified so that it returns the three most probable flight routes using the extracted features (without even using flight timetables). After finding a set of probable flight routes, it sorts the routes based on their error, defined as the weighted sum of absolute differences between the features (elevation and flight duration) calculated from sensory data and their expected values extracted from airports' specifications database.

Figure 14:
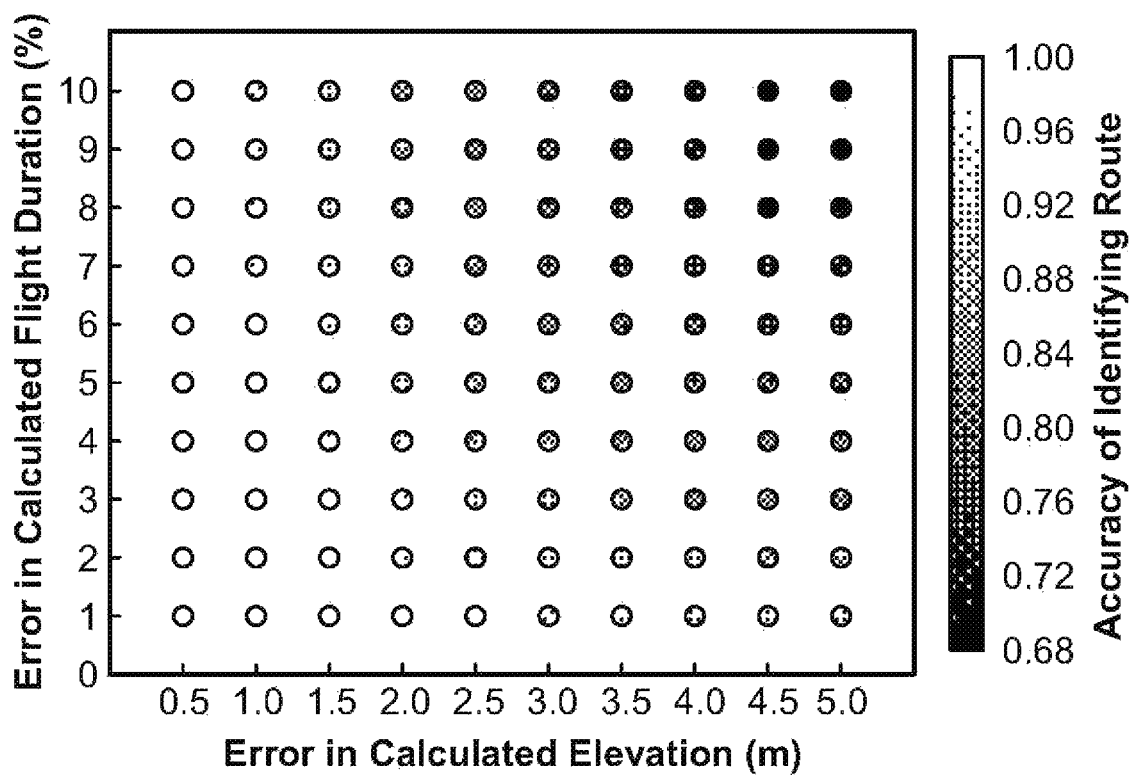
FIG. 14 is a graph illustrating the accuracy of the planeTracker estimator according to an embodiment of the present invention.
Figure 15:
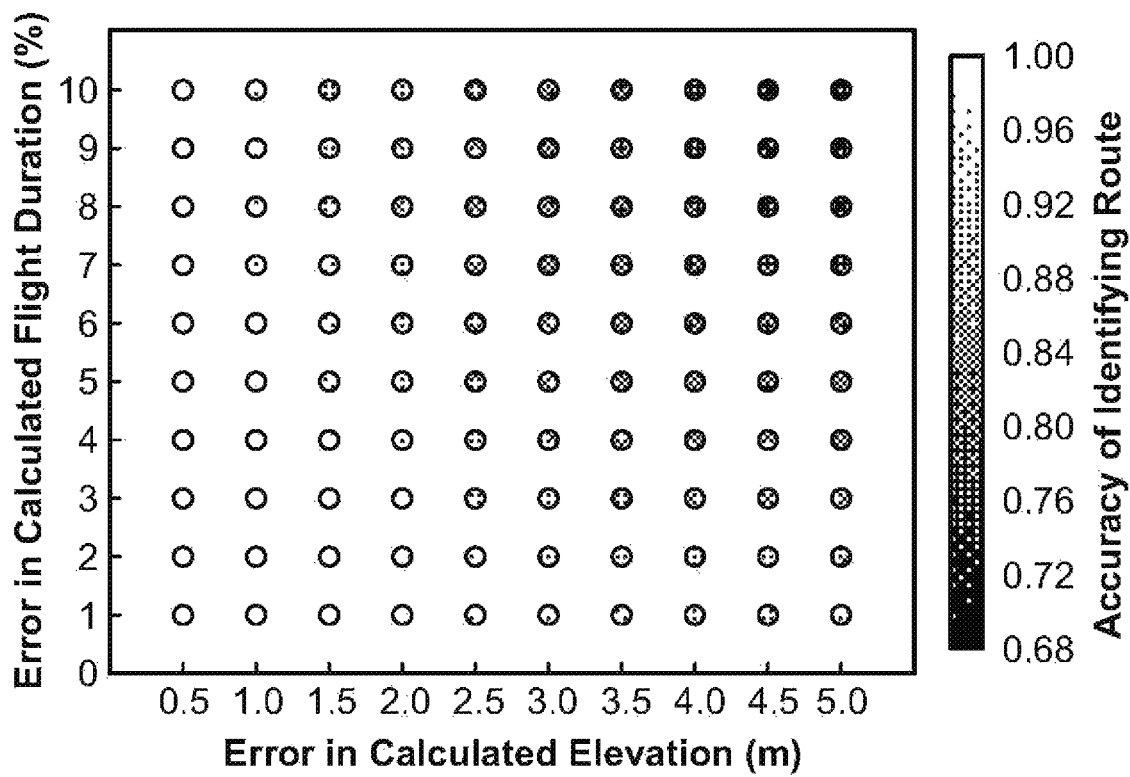
FIG. 15 is a graph illustrating the accuracy of the planeTracker estimator given the departure airport according to an embodiment of the present invention.

FIG. 14 demonstrates how accurately planeTracker is able to find the actual flight route without knowing the departure airport, where accuracy is defined as the number of cases in which the actual flight route was among the three returned flight candidates divided by the total number of trials (500). Similarly, FIG. 15 shows how accurately planeTracker can find the destination airport, given the departure airport. Despite the presence of potential differences between the approximated duration and elevation and their expected values, in the majority of cases, planeTracker was able to find a set of three routes/destination airports that includes the actual flight route/destination airport, as illustrated in FIGS. 14 and 15, respectively.

Estimator 3: trainTracker: As mentioned earlier, trainTracker returns both departure and destination stations. The accuracy of the tracking mechanism in finding actual traveling routes was examined using the 30 data chunks collected by the smartphone (10 chunks for Princeton Junction Station to New York, 10 chunks for Baltimore Penn Station to New York, and 10 chunks for Washington D.C. Union Station to New York). The experimental results demonstrated that trainTracker was able to accurately identify the user's travel route in all trials.

Figure 16:
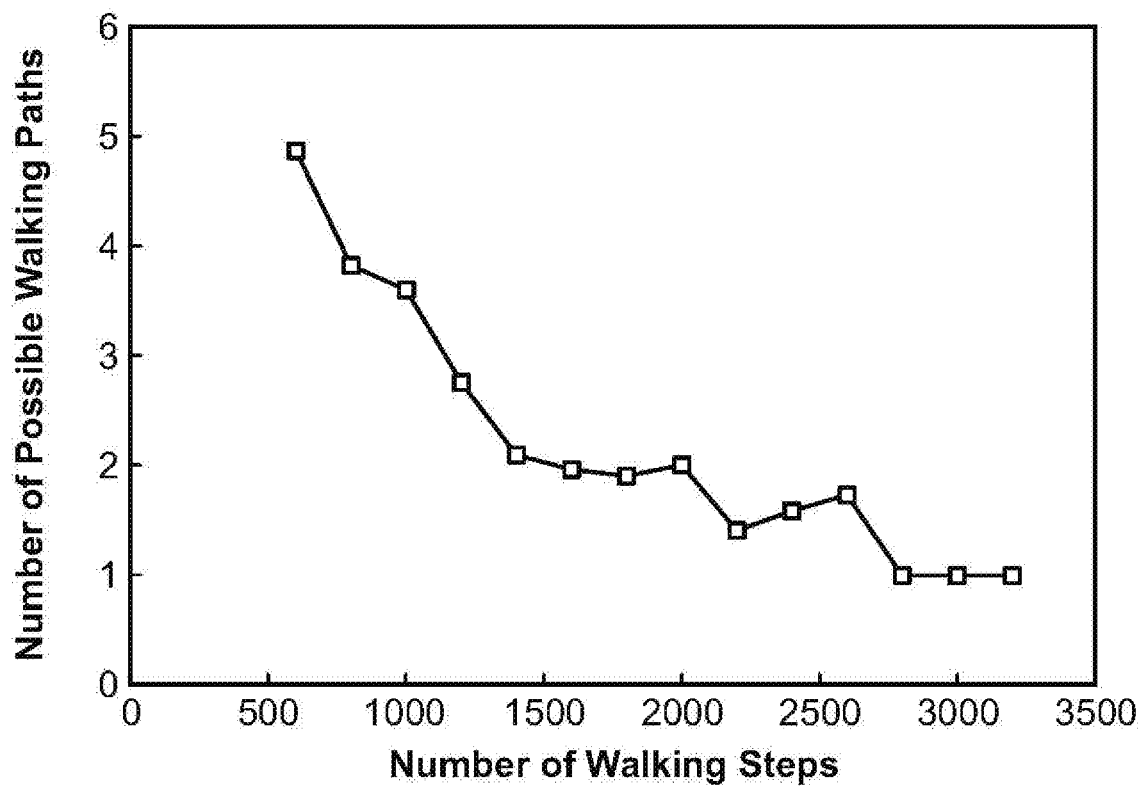
FIG. 16 is a graph illustrating how the number of possible walking paths will change with respect to the number of walking steps according to an embodiment of the present invention.

Estimator 4: walkingUserTracker: As mentioned earlier, two different versions of walkingUserTracker have been implemented: one that searches the whole map, and the other one that assumes the initial location is within a small area (300 m×300 m) around the final location of the last activity. FIG. 16 shows how the number of possible walking paths will change with respect to the number of walking steps for the first version of the estimator. Based on the empirical results, although the possible number of candidates is reduced quickly, the possibility of each of them at each moment of time is similar to the others (i.e., when the number of steps is small, uniquely distinguishing the actual path is not feasible). As shown in FIG. 16, in order to return a unique accurate path, the first version of the estimator requires a long stream of sensory data (i.e., the user should walk over 2500 steps). It was observed that, in real-world scenarios, usually when walk shorter distances were walked (including only a few different roads), they were preceded by other activities (commonly driving). Thus, to accurately track the user in real-world scenarios during multiple activities, it is suggested to use the second version of the estimator that utilizes the data provided by the previous activity.

Figure 17:
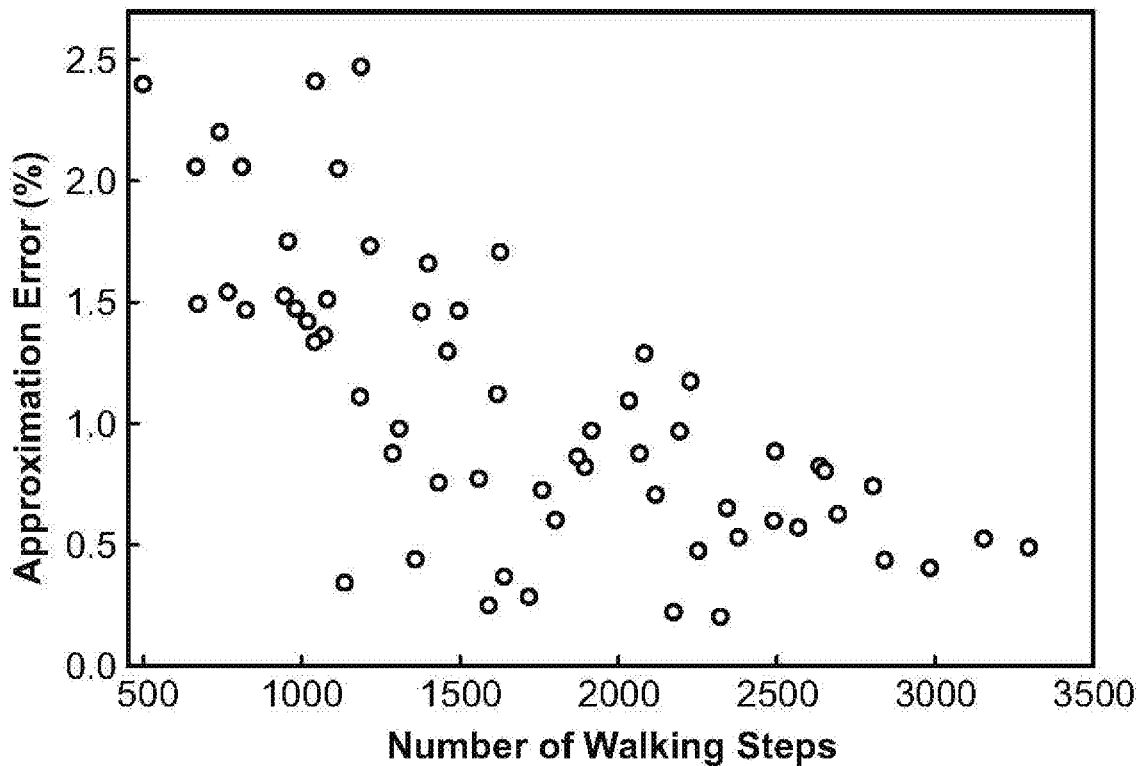
FIG. 17 is a graph illustrating approximation error for all walking trials with respect to the number of steps according to an embodiment of the present invention.

It was examined how accurately the second version of walkingUserTracker estimates the user's location. FIG. 17 shows the approximation error for all walking trials with respect to the number of steps, where approximation error is defined as the distance between the user's actual location (as provided by GPS sensor) and the user's estimated location (as estimated by PinMe), divided by the total walking distance. As shown in the FIG. 17, the approximation error was less than 2.5% for all data chunks.

(ii) End-to-End Evaluation

Figure 18:
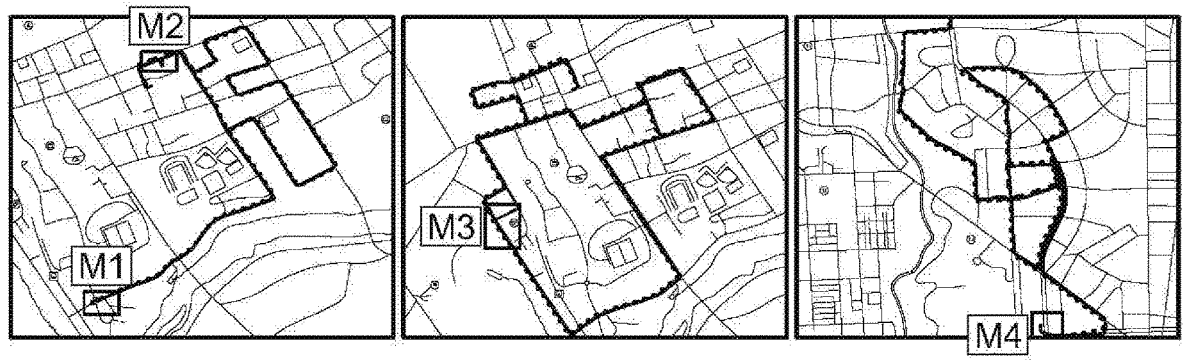
FIG. 18 is a map demonstrating actual trajectories and estimated trajectories of an actual user according to an embodiment of the present invention.

In order to provide an end-to-end evaluation, the accuracy of PinMe was evaluated using Dataset #2. As discussed earlier, two different versions of walkingUserTracker were implemented. For this evaluation, the second version was used, which assumes that the user is within a small area around their vehicle after they leave the vehicle. FIG. 18 demonstrates the actual trajectories of the users' movements (as provided by GPS sensor) along with the estimated trajectories (as provided by PinMe). As illustrated in FIG. 18, for all three data streams, which were collected by three different users while carrying three different smartphones, the actual trajectories of the users' movements were very similar to the estimated ones provided by PinMe. However, four mismatch areas were observed (bounded by dashed line boxes in FIG. 18). In the first and last areas (M1 and M4), the starting point of the actual driving path was slightly different from the point discovered by PinMe due to the similarities between two nearby intersections marked on the map. In two other mismatch areas, PinMe more accurately located the user than GPS. The GPS trajectory shows that the user's vehicle was off the road (M2). Furthermore, it indicates that the user was off the sidewalk when he was walking (M3). In these two cases, we checked the validity of PinMe's trajectories with the users, and they confirmed that the results provided by PinMe show the actual trajectory in M2 and M3.

Based on the experimental results, the location estimation accuracy of carTracker was independent of the user's smartphone and vehicle. This was expected for two reasons. First, PinMe utilizes sensory data, which do not correlate with the smartphone model (air pressure, heading, and acceleration), as opposed to conventional methods that use power consumption, which highly correlates with the smartphone model. Second, as described earlier, carTracker mainly relies on air pressure and heading to track the vehicle when the user is driving—this data is not correlated with the vehicle model, as opposed to acceleration data that is correlated with the vehicle model due to the existence of vibrations caused by the engine of the running vehicle.

Countermeasures

This section briefly describes several countermeasures (along with their shortcomings) for mitigating the risks of unwanted location tracking.

(1) Adaptive Sampling Rate

Figure 19:
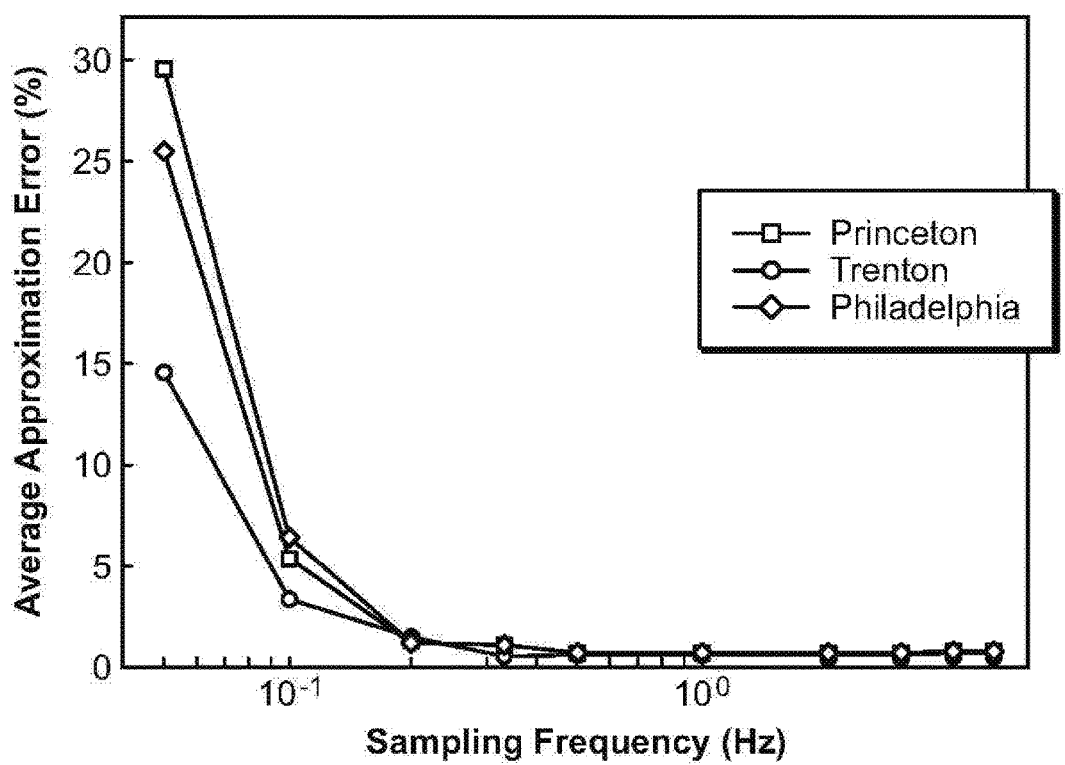
FIG. 19 is a graph illustrating how the average approximation error of carTracker changes with respect to sampling rate according to an embodiment of the present invention.

Limiting the sampling rate of sensors can potentially limit the amount of information leaked by a mobile device. In order to briefly discuss how the accuracy of PinMe might be negatively impacted if the sampling rate decreases, carTracker was examined using sensory data collected at different sampling rates. FIG. 19 shows how the average approximation error of carTracker changes with respect to the sampling rate. As the sampling rate is decreased, the approximation error only slightly increases for this estimator (even when the sampling rate is around 0.1 Hz). However, based on the empirical results, the accuracy of carTracker suddenly drops when the sampling rate becomes very low (i.e., below 0.02 Hz) since the estimator cannot detect the intersection (when the car turns) anymore. Many benign applications (for example, fitness tracker and fall detection) require a sampling frequency larger than 0.1 Hz, and thus decreasing the sampling rate of sensors below 0.1 Hz, to prevent location tracking, would reduce the efficiency, efficacy, and utility of trusted applications as well.

Utilizing context-aware sampling mechanisms, which can adaptively control sensor sampling rates, may be an alternative approach to maximizing utility and minimizing information leakage. For example, consider a mechanism that changes the maximum allowable sampling rate of the sensors based on user's current activity. Such a mechanism can allow a fitness tracking application to obtain very frequent samples from the accelerometer when the user is running and only allow infrequent sampling when the user is driving.

(2) Risk-Evaluation Mechanism

Generally, a risk-evaluation mechanism aims to share a mobile device's data in such a way that certain kinds of inferences cannot be drawn. It examines if a set of sensory/nonsensory data collected by an application can leak sensitive information about the user, and blocks an application upon the detection of a potential information leakage. A few recent research efforts have been geared towards risk-evaluation mechanisms that can be implemented on a mobile device to ensure user privacy. For instance, one proposal is referred to as ipShield, a framework to control the sensory data that are accessible by various applications installed on a smartphone. This risk-evaluation mechanism continuously examines what inferences can be made from the shared sensory/non-sensory information.

Another proposal is a defense against runtime-information-gathering attacks in which a malicious app runs side-by-side with a target application (a victim) and performs runtime information gathering (RIG). It is suggested to temporarily stop the applications that are potentially able to collect data from a sensitive application or kill applications that may be collecting side-channel information in the background while the foreground application performs sensitive tasks. Two suspicious activities that can reveal maliciousness of an application are discussed: (1) a high sampling rate needed for continuous monitoring, (2) the presence of a correlation between an application's activity and the activity of a sensitive application. The location estimators disclosed herein need a much lower sampling frequency (for example, as shown earlier, 0.1 Hz led to accurate results for carTracker) than the frequency used in many previous location trackers. Therefore, sampling rate cannot be solely used to reveal the malicious activity of PinMe. Furthermore, PinMe does not require any data from other applications since it directly collects permission-free data, therefore, there is no correlation between its activity and other applications' activities. Finally, this defense relies on monitoring application-specific files, which are no longer accessible in Android M. Thus, this approach does not address PinMe.

(3) Sensor Data Manipulation

Sensor data manipulation enables the user to manipulate or add noise to the content of collected sensory data when the user is apprehensive about sensor data abuse in certain sensing applications. Typical data manipulation approaches include rounding the values in the sensory data to approximate values, replacing particular sensor readings by previously-recorded readings, and adding random noise to the sensory data. However, as mentioned earlier, unlike many previous location trackers, PinMe relies on several macro-level features extracted from sensory data. As a result, it is robust against several potential sources of noise. For example, for planeTracker, it only extracts the aviation phases of the plane from noisy acceleration readings (as opposed to the actual displacement) from which it estimates the flight duration. As shown earlier, planeTracker was able to find a set of three routes (airports) that includes the actual flight route (destination airport), with a high level of accuracy, even when the approximated duration and elevation are assumed to be inaccurate due to the presence of noise (up to 10% for flight duration and 5 m for elevation).

Adding significant noise to sensory readings or replacing data with previously-recorded data may significantly reduce the utility of trusted applications relying on such sensory data.

(4) Turn-Off Switch

A hardware turn-off switch that lets the user quickly and easily turn off all sensors or a sensor-free mode implemented in the operating system in which no application can obtain sensory information enables the user to easily stop information leakage when the user suspects that there might be privacy risks. For example, the user can turn off all sensors when driving to ensure that no application can track the user.

Potential Limitations

Four potential limitations of PinMe are briefly discussed.

PinMe uses the history of smartphone IP addresses to infer the last city in which the user was connected to a WiFi network. In fact, it assumes that the user is directly connected to the Internet. Thus, if the user utilizes an anonymous communication service, e.g., Tor [53], PinMe may fail to locate the user. However, as mentioned earlier, the interdependence between activities can be used to resolve this limitation.

Moreover, PinMe relies significantly on the variability of elevations and route directions. Therefore, PinMe might be unable to estimate the user's location if the user only moves in grid routes, e.g., some parts of Manhattan, N.Y., in which the roads are almost flat and parallel to each other. Furthermore, since PinMe relies on publicly-available datasets, the existence of erroneous data in auxiliary datasets given to PinMe may reduce the location estimation accuracy. For example, OSM navigational maps do not typically include very recent constructions/detours. Therefore, if the user travels through a new road that has not been added to the map, PinMe may fail to track the user.

Despite the above-mentioned limitations, PinMe presents a significant advance in state-of-the-art mobile device-based user location, since it enables location with minimal requirements and offers high location estimation accuracy.

PinMe as an Alternative to GPS

PinMe can offer a more secure navigation mechanism for autonomous vehicles than traditional GPS systems.

With the widespread use of GPS receivers in modern vehicles, ranging from yachts to autonomous cars, the security of GPS has garnered ever-increasing attention in recent years. GPS receivers compare timestamped signals from a constellation of satellites, inferring their position through computations on the lightspeed lag from each signal. Several research studies have demonstrated the feasibility of faking the satellite signals needed for positioning and mentioned that security attacks against the GPS signals used in autonomous vehicles may lead to disastrous consequences.

Unfortunately, protecting GPS signals against spoofing is difficult for three reasons. First, the computational load associated with cryptographic signatures on the signal is high. Second, it is impossible to use a challenge-response protocol since the communication channel between the satellites and GPS receiver is unidirectional, i.e., the receiver cannot transmit data to the satellites. Third, the implementation of new algorithms/mechanisms, which need modifications to the GPS infrastructure, is difficult and costly. Comparable to GPS, PinMe was able to accurately locate the user of a mobile device during different activities. A slightly modified version of PinMe may be implemented on autonomous vehicles, e.g., driverless cars, as a stand-alone in-vehicle positioning system. For example, air pressure and heading sensors can be added to driverless vehicles, enabling sensory data to be processed by on-vehicle processing units. Odometer readings are easily accessible to in-vehicle processing units and may be used to further improve the accuracy of PinMe. Since PinMe does not collect sensory data from any remote sources, it is resilient against remote attacks, assuming that navigational/elevation maps provided are accurate.

As such, disclosed herein is a location tracker where no prior knowledge of the area of interest is required, an attack-specific training dataset is not required, and data is not collected at a high sampling rate. Evaluation of the proposed user-location mechanism demonstrated that it is feasible to gain sensitive information about the user's location without accessing location services, e.g., GPS.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A method for locating a user of a mobile device comprising:
    determining a location that the mobile device was connected to a wireless network based on a network status and internet protocol (IP) address of the mobile device;
    compiling publicly-available auxiliary information related to the location the mobile device was connected to the wireless network;
    classifying an activity of the user to driving, traveling on a plane, traveling on a train, or walking; and
    estimating a current location of the user without accessing global positioning system (GPS) data based on the compiled publicly-available auxiliary information and one or more of sensory data and time zone data of the mobile device particular to the activity classification of the user;
    wherein estimating a current location of the user is based on public maps, weather reports, air pressure, acceleration, and heading when the activity of the user is classified as walking.

2. The method of claim 1, wherein sensory data comprises one or more of air pressure, heading, and acceleration.

3. The method of claim 1, wherein auxiliary information comprises one or more of public maps, transportation time tables, airport databases, weather reports, and train heading datasets.

4. The method of claim 1, wherein classifying the activity of the user is based on one or more of machine learning and physical characteristics of each activity.

5. The method of claim 1, wherein estimating a current location of the user is based on air pressure, heading, one or more public maps, and one or more weather reports when the activity of the user is classified as driving.

6. The method of claim 1, wherein estimating a current location of the user is based on air pressure, acceleration, time zone, one or more weather reports, one or more airport databases, and one or more flight timetables when the activity of the user is classified as traveling on a plane.

7. The method of claim 1, wherein estimating a current location of the user is based on acceleration, heading, one or more train timetables, and one or more train heading datasets when the activity of the user is classified as traveling on a train.

8. A system for locating a user of a mobile device comprising a processor programmed to:
   determine a location that the mobile device was connected to a wireless network based on a network status and internet protocol (IP) address of the mobile device;
   compile publicly-available auxiliary information related to the location the mobile device was connected to the wireless network;
   classify an activity of the user to driving, traveling on a plane, traveling on a train, or walking; and
   estimate a current location of the user without accessing global positioning system (GPS) data based on the compiled publicly-available auxiliary information and one or more of sensory data and time zone data of the mobile device particular to the activity classification of the user;
   wherein estimating a current location of the user is based on public maps, weather reports, air pressure, acceleration, and heading when the activity of the user is classified as walking.

9. The system of claim 8, wherein sensory data comprises one or more of air pressure, heading, and acceleration.

10. The system of claim 8, wherein auxiliary information comprises one or more of public maps, transportation time tables, airport databases, weather reports, and train heading datasets.

11. The system of claim 8, wherein classifying the activity of the user is based on one or more of machine learning and physical characteristics of each activity.

12. The system of claim 8, wherein estimating a current location of the user is based on air pressure, heading, one or more public maps, and one or more weather reports when the activity of the user is classified as driving.

13. The system of claim 8, wherein estimating a current location of the user is based on air pressure, acceleration, time zone, one or more weather reports, one or more airport databases, and one or more flight timetables when the activity of the user is classified as traveling on a plane.

14. The system of claim 8, wherein estimating a current location of the user is based on acceleration, heading, one or more train timetables, and one or more train heading datasets when the activity of the user is classified as traveling on a train.

15. A non-transitory computer-readable medium having stored thereon a computer program for execution by a processor configured to perform a method for locating a user of a mobile device, the method comprising:
   determining a location that the mobile device was connected to a wireless network based on a network status and internet protocol (IP) address of the mobile device;
   compiling publicly-available auxiliary information related to the location the mobile device was connected to the wireless network;
   classifying an activity of the user to driving, traveling on a plane, traveling on a train, or walking; and
   estimating a current location of the user without accessing global positioning system (GPS) data based on the compiled publicly-available auxiliary information and one or more of sensory data and time zone data of the mobile device particular to the activity classification of the user;
   wherein estimating a current location of the user is based on public maps, weather reports, air pressure, acceleration, and heading when the activity of the user is classified as walking.

16. The computer-readable medium of claim 15, wherein sensory data comprises one or more of air pressure, heading, and acceleration.

17. The computer-readable medium of claim 15, wherein auxiliary information comprises one or more of public maps, transportation time tables, airport databases, weather reports, and train heading datasets.

18. The computer-readable medium of claim 15, wherein classifying the activity of the user is based on one or more of machine learning and physical characteristics of each activity.

19. The computer-readable medium of claim 15, wherein estimating a current location of the user is based on air pressure, heading, one or more public maps, and one or more weather reports when the activity of the user is classified as driving.

20. The computer-readable medium of claim 15, wherein estimating a current location of the user is based on air pressure, acceleration, time zone, one or more weather reports, one or more airport databases, and one or more flight timetables when the activity of the user is classified as traveling on a plane.

21. The computer-readable medium of claim 15, wherein estimating a current location of the user is based on acceleration, heading, one or more train timetables, and one or more train heading datasets when the activity of the user is classified as traveling on a train.

* * * * *